(12) United States Patent
Appleby et al.

(10) Patent No.: US 6,649,299 B2
(45) Date of Patent: Nov. 18, 2003

(54) GAS DIFFUSION ELECTRODE WITH NANOSIZED PORES AND METHOD FOR MAKING SAME

(75) Inventors: A. John Appleby, Bryan, TX (US); Serguey Gamburzev, College Station, TX (US)

(73) Assignee: The Texas A&M University System, College Station, TX (US)

( * ) Notice: Subject to any disclaimer, the term of this patent is extended or adjusted under 35 U.S.C. 154(b) by 156 days.

(21) Appl. No.: 09/779,868

(22) Filed: Feb. 8, 2001

(65) Prior Publication Data

US 2001/0031389 A1 Oct. 18, 2001

Related U.S. Application Data

(60) Provisional application No. 60/182,010, filed on Feb. 11, 2000, provisional application No. 60/181,893, filed on Feb. 11, 2000, and provisional application No. 60/181,894, filed on Feb. 11, 2000.

(51) Int. Cl.[7] .................. H01M 4/86; H01M 4/88; H01M 6/00
(52) U.S. Cl. .................. 429/40; 429/42; 429/41; 429/44; 429/30; 429/32; 429/13; 29/623.1; 29/623.4; 502/101
(58) Field of Search .............. 429/34, 32, 26, 429/27, 13, 40, 41, 42, 44, 30; 29/623.1, 623.4

(56) References Cited

U.S. PATENT DOCUMENTS

| | | | |
|---|---|---|---|
| 4,058,482 A | 11/1977 | Baris et al. ............... 252/425.3 |
| 4,818,741 A | 4/1989 | Herscovici ................. 502/101 |
| 5,364,712 A | 11/1994 | Townsend .................... 429/42 |
| 6,280,871 B1 * | 8/2001 | Tosco et al. .................. 429/41 |
| 6,531,240 B1 * | 3/2003 | Brown et al. ................. 429/44 |
| 2001/0049048 A1 * | 12/2001 | Xawahara .................... 429/44 |

FOREIGN PATENT DOCUMENTS

| | | |
|---|---|---|
| EP | 0709907 A1 | 5/1996 |
| WO | WO 97/24474 | 7/1997 |
| WO | WO 00/72373 A1 | 11/2000 |

OTHER PUBLICATIONS

PCT International Search Report.

* cited by examiner

Primary Examiner—Patrick Ryan
Assistant Examiner—Angela J. Martin
(74) Attorney, Agent, or Firm—Howrey Simon Arnold & White, LLP

(57) ABSTRACT

A porous gas diffusion electrode for polymer electrolyte membrane fuel cells. The electrode contains an electrocatalyst, a polymer electrolyte and nanosized pores. The pores are formed using nanosized pore-formers. The pore-former is applied to a substrate along with a polymer electrolyte and an electrocatalyst and the resulting structure is treated to remove the pore-former.

32 Claims, 26 Drawing Sheets

GAS DIFFUSION ELECTRODE WITH NANOSIZED PORES AND METHOD FOR MAKING SAME

This application claims the benefit of provisional application Ser. Nos. 60/182,010, 60/181,893, and 60/181,894, filed Feb. 11, 2000, which are incorporated herein by reference.

The U.S. government may have certain rights in this invention pursuant to Grant Number N00014-95-1-0114, which was awarded by the Office of Navel Research.

FIELD OF THE INVENTION

This invention relates generally to the field of electrical power generation, and more particularly to the generation of electrical power using an electrochemical fuel cell.

BACKGROUND OF THE INVENTION

A fuel cell is an energy conversion device that efficiently converts stored chemical energy into electrical energy. Conventional fuel cells generally operate by combining hydrogen with oxygen to generate direct current electrical power. The overall chemical reaction for this process is described by Equation 1.

$$2H_2 + O_2 \rightarrow 2H_2O \qquad \text{Equation 1.}$$

In order to generate enough power to be usable for practical applications, multiple fuel cells are combined electrically in series. In this stacked configuration, the individual fuel cells are connected one after another, similar to the cells of a conventional voltaic battery.

At its fundamental level, the individual fuel cell contains an electrode at which oxygen is reduced (the cathode) and another electrode at which fuel is oxidized (the anode). Fuel cell electrodes are generally of the gas diffusion type and are made of an electrically-conducting support material, an active catalytic layer, and an electrolyte.

Chemical pore-formers have been used to control the porosity of these layers. These pore-formers, or porophoric agents, are added as powders or crystals to the compositions of the various layers. The pore-formers eventually decompose in the gas phase or are dissolved in solution in post-fabrication steps. Conventional pore formers include powdered ammonium bicarbonate, ammonium chloride, and urea, which are either lost in the gas phase or via dissolution. Such particles are generally coarse and operate like yeast in dough, forming a sponge-like structure with rather coarse porosity. These pore-formers are too large to be compatible with the thin active layers that can be prepared by methods such as paint- or ink-like application or rolling (calendering).

The membrane electrode assembly (MEA), which is composed of the anode, cathode and electrolyte membrane, is generally sandwiched between gas flow-fields. These flow fields allow the reactant gases (separate streams of $H_2$ and $O_2$) to contact the MEA. Conventional flow-fields are formed by pore-free grooved graphite plates, wherein the reactant gases flow through a serpentine-shaped groove. A drawback to this type of flow field is that it requires heavy tie rods and end-plates to compress the flow-fields and MEAs together to maintain electrical contact.

In a fuel cell stack, the individual fuel cells are connected to each other by bipolar plates. The bipolar plates provide electrical contact between the cells and may also be involved in cooling the stack. Once again, the traditional approach is to maintain contact between the cells and the bipolar plates by applying pressure to the stack using end-plates squeezed together by heavy tie rods.

Porous metals are an attractive alternative to heavy graphite flow fields. Porous metals that have been used as flow field material include porous copper, porous nickel, porous aluminum, porous titanium, and porous aluminum-titanium alloys (U.S. Pat. Nos. 6,022,634 and 6,146,780). The fuel cells shown in U.S. Pat. No. 6,022,634 use porous metal flow fields and collapsed porous metal current collectors. These components are pressed together between endplates and still require tie rods or some means of applying external pressure to the cells to maintain electrical contact between the components. Flow-fields shown in U.S. Pat. No. 6,146,780 are made of metal foams that are spot welded to gas impermeable bipolar separator plates.

The polymer electrolyte membrane (PEM) material generally used in polymer electrolyte membrane fuel cells (PEMFCs) is generally composed of a linear, branched-chain perfluorinated polyether polymer with a non-crosslinked structure that has terminal sulfonic acid end-groups. An example of such material is Nafion® (Du Pont de Nemours and Company, Wilmington, Del.). Nafion® requires a substantial amount of water (typically 10–20 water molecules per sulfonic acid group) to give adequate proton conductivity. The high water requirements are due to the volume occupied by the hydrophobic fluorinated sulfonic acid polymer chain. Proton conduction only takes place down self-organizing hydrophilic channels or micelles which occupy only a small portion of the total superficial area of a PEM electrolyte film, reducing the corresponding specific conductivity compared with the local value in the channels. The hydrophobicity of the polymer chain also limits the local amount of water associated with the sulfonic acid. This amount of water increases rapidly as the equivalent weight or the ratio of the molecular weight of polymer chain to sulfonic acid becomes less, and it falls with increasing temperature. Conductivity is highest when liquid water is in contact with the membrane at any given temperature. For this reason, developers have generally supplied PEMFCs with the reactants (hydrogen and air) humidified to at least the cell operating temperature, so that product water is formed in the liquid state.

Since the system must generally operate below the local boiling point of water, excess water used for humidification, plus the product water from the reaction, collects in the cathode gas flow channels. Means must therefore be provided to continuously remove it. The fact that the PEMFC produces liquid water under normal circumstances is a major operational flaw and considerable ingenuity is required to deal with it, especially in larger cells.

In the General Electric Company fuel cell used in the Gemini space missions starting in 1965, water was required to be removed in a microgravity environment. Water management was accomplished by providing a wicking material in the cathode flow channels of each cell. The exit end of the wick in each individual cell communicated over the active width of the cell with a porous water separator plate arranged in parallel with the cells in the stack. A differential oxygen pressure drove the water through this separator plate to a product water accumulator for storage as drinking water and for recycle to the entry side of each wick to maintain conductivity (Appleby et al., *Energy* 11: 137 (1986); Liebhavsky et al., *Fuel Cells and Fuel Batteries,* Academic Press, 587 (1964)).

In the Gemini cell, the membrane was not fluorinated for stability and operated at close to ambient temperature and at low current density for high efficiency. The non-fluorinated membrane was prone to hot-spots with gas-crossover, and was replaced by Nafion® as soon as it became available in the late 1960s. In the Ballard stack design (Prater et al., *J. Power Sources,* 61: 105 (1996), U.S. Pat. Nos. 5,521,018, 5,527,363, and 5,547,776), the water is forced out of the cathode flow channels by applying a large pressure differential between the inlet and exit side. This requires the use of very long, serpentine flow channels, each with a length many times the cell width (U.S. Pat. Nos. 4,988,583 and 5,108,849). While Ballard has looked at other systems for removing water, a vapor phase feedback loop at the anode (after back-diffusion from the cathode channels) (U.S. Pat. No. 5,441,819), the serpentine channel design is still retained. This design means that the stack will only operate under pressurized conditions, with a minimum operating pressure between 2 and 3 atmospheres absolute (atma) of air. Pressurized operation requires either a stack with heavy filter-press components or a pressure vessel surrounding the stack. Both of these reduce the flexibility of stack design, and necessitate the use of liquid cooling system with an external radiator. The reactants are prehumidified to cell operating temperature by passing them through membrane-humidification cells which may or may not be arranged en bloc with the electrochemical stack. The water circulation in the humidification cells is deionized cooling water exiting the cooling plates (generally, one every 4 or 5 active cells) in the electrochemical stack.

In the International Fuel Cells stack design (U.S. Pat. Nos. 4,769,297 and 5,503,944), a graphite wicking plate with controlled porosity is used on the cathode side. The graphite plate has deionized water cooling flow channels on its reverse side, which contact a similar porous graphite wicking plate on the anode side of the next cell. Thus, there is one cooling plate per cell. The anode side of each cell is pressurized to −0.075 to −0.15 atmospheres gauge (atmg) compared to the cooling water stream, and the cathode side is correspondingly at +0.075 to +0.15 atmg. This means that there is a net flow of pure water from the cooling stream to the anode for humidification, and a corresponding flow of this and product water from the cathode channels to the cooling stream. All of the above approaches require controlled pressure differentials that are unsuitable for use in small lightweight stacks. They also use a water-cooling subsystem, which requires a heat exchanger, pumps, and controls, which add weight, as do the elements required for humidification. While such humidification is active, it proceeds automatically in each cell, and may be called internal humidification to distinguish it from external humidification via the reactant gases before they are led into the cell.

In true internal- or self-humidification, a portion of the water produced in the fuel cell reaction is reabsorbed by the membrane electrolyte keeping the latter moist during fuel cell operation (U.S. Pat. Nos. 5,242,764 and 5,318,863; Dhar, *J. Electroanal. Chem.,* 357: 237 (1993)). This requires back-diffusion of water from the cathode to the anode side, hence a thin PEM film. In addition, it requires the use of rather short flow channels, so that efficient back-diffusion of water can occur, preferably in a counter-flow system or one operating dead-headed on hydrogen. It also requires careful control of oxygen utilization, hence air-flow rate as a function of current density, as well as that of cell temperature. For example, if oxygen utilization in dry air cathode reactant is 50%, the cathode exit gas is humidified to 0.182 atm, or 138 torr at 1 atma total pressure. This sets an upper limit of cell operating temperature of about 59° C. at the cell exit, since this must not exceed the dew point of the reactant gases at any point in the cell. The cathode exit should also be the hottest part of the cell so if the system is air-cooled by a separate air stream, cooling air and process air should be co-flow. In practice, the maximum average cell temperature should be in the 50–55° C. range to ensure that the anode and cathode inlets, which operate under the lowest dew point conditions, function satisfactorily.

SUMMARY OF THE INVENTION

One aspect of the invention is a method of making a gas diffusion electrode comprising the steps of forming an electrode on a substrate by applying a mixture comprising a polymer electrolyte, an electrocatalyst, and a nanosized pore-former to the substrate; and treating the electrode to remove the nanosized pore-former. According to one embodiment the pore-former comprises fumed silica.

A further aspect of the invention is a method for making a membrane electrode assembly comprising the steps of forming an electrode on a substrate by applying a mixture comprising a polymer electrolyte, an electrocatalyst, and a nanosized pore-former to the substrate; attaching the electrode to a membrane to form a membrane electrode assembly; and treating the electrode to remove the pore-former.

A still further aspect is a method for making a gas permeable layer for use in a gas diffusion electrode comprising the steps of applying to a composition a nanosized pore-former; and treating the composition to remove the nanosized pore-former. A further aspect of the invention is an electrode comprising a polymer electrolyte, an electrocatalyst, and nanosized pores.

Another aspect of the invention is an electronically conducting fuel cell component comprising a porous metal flow field, an intermediate layer bonded directly to the porous metal flow field, and an electrode bonded directly to the intermediate layer. A still further aspect of the present invention is a method for making an electronically conducting fuel cell component comprising the steps of directly bonding an electrically conducting intermediate layer to a porous flow field, and directly bonding an electrode to the intermediate layer.

A further aspect of the invention is a fuel cell comprising first and second monolithic electrically conducting flow field-bipolar plate assemblies arranged essentially parallel to each other such that an inside surface of the first flow field-bipolar plate assembly is facing an inside surface of the second flow field-bipolar plate assembly, wherein the flow field-bipolar plate assemblies are electrically and mechanically connected by intervening layers. The intervening layers may comprise a first electrically conducting intermediate layer bonded directly to the inside surface of the first flow field-bipolar plate assembly, a second electrically conducting intermediate layer bonded directly to the inside surface of the second flow field-bipolar plate assembly, a first electrode bonded directly to the inside surface of the first electrically conducting intermediate layer, a second electrode bonded directly to the inside surface of the second electrically conducting intermediate layer, and a polymer electrolyte membrane between and bonded directly to both of the electrodes.

A still further aspect of the present is an electrochemical fuel cell stack comprising two electrically conducting endplates and a plurality of electrochemical fuel cells disposed between the endplates. The electrochemical fuel cells may comprise first and second monolithic electrically conducting flow field-bipolar plate assemblies arranged essentially parallel to each other such that an inside surface of the first flow field-bipolar plate assembly is facing an inside surface of the second flow field-bipolar plate assembly, wherein the flow field-bipolar plate assemblies are electrically and mechanically connected by intervening layers. The intervening layers may comprise a first electrically conducting intermediate layer bonded directly to the inside surface of the first flow field-bipolar plate assembly, a second electrically conducting intermediate layer bonded directly to the inside surface of the second flow field-bipolar plate assembly, a first electrode bonded directly to the inside surface of the first electrically conducting intermediate layer, a second electrode bonded directly to the inside surface of the second electrically conducting intermediate layer, and a polymer electrolyte membrane between and bonded directly to both of the electrodes.

A further aspect of the invention is a method of making a fuel cell stack comprising disposing between two electrically conducting endplates a plurality of electrochemical fuel cells, wherein the electrochemical fuel cells comprise first and second monolithic electrically conducting flow field-bipolar plate assemblies arranged essentially parallel to each other such that an inside surface of the first flow field-bipolar plate assembly is facing an inside surface of the second flow field-bipolar plate assembly, and wherein the flow field-bipolar plate assemblies are electrically and mechanically connected by intervening layers. The intervening layers may comprise a first electrically conducting intermediate layer bonded directly to the inside surface of the first flow field-bipolar plate assembly, a second electrically conducting intermediate layer bonded directly to the inside surface of the second flow field-bipolar plate assembly, a first electrode bonded directly to the inside surface of the first electrically conducting intermediate layer, a second electrode bonded directly to the inside surface of the second electrically conducting intermediate layer, and a polymer electrolyte membrane disposed between and bonded directly to both of the electrodes.

A still further aspect of the invention is method of generating electrical power comprising supplying hydrogen and oxygen to an electrochemical fuel cell stack, wherein the electrochemical fuel cell stack comprises two electrically conducting end-plates and a plurality of electrochemical fuel cells disposed between the endplates; wherein the electrochemical fuel cells comprise first and second monolithic electrically conducting flow field-bipolar plate assemblies arranged essentially parallel to each other such that an inside surface of the first flow field-bipolar plate assembly is facing an inside surface of the second flow field-bipolar plate assembly, and wherein the flow field-bipolar plates assemblies are electrically and mechanically connected by intervening layers. The intervening layers may comprise a first electrically conducting intermediate layer bonded directly to the inside surface of the first flow field-bipolar plate assembly, a second electrically conducting intermediate layer bonded directly to the inside surface of the second flow field-bipolar plate assembly, a first electrode bonded directly to the inside surface of the first electrically conducting intermediate layer, a second electrode bonded directly to the inside surface of the second electrically conducting intermediate layer, and a polymer electrolyte membrane between and bonded directly to both of the electrodes.

Yet a further aspect of the invention is an air cooled condenser for use with a fuel cell stack, the condenser comprising a three-dimensionally reticulated porous metal condensing element and a three-dimensionally reticulated porous metal cooling element, wherein the three-dimensionally reticulated porous metal condensing element is disposed between two gas impermeable barriers by continuous metallurgical bonds, and wherein the three dimensionally reticulated porous metal cooling element is disposed between and bonded directly to two other gas impermeable barriers.

A further aspect of the present invention is an evaporatively cooled internally humidified fuel cell stack comprising a plurality of fuel cells and an air cooled condenser in fluid communication with the fuel cells, wherein the condenser comprises a plurality of three-dimensionally reticulated porous metal condensing elements and a plurality of three-dimensionally reticulated porous metal cooling elements, wherein the three-dimensionally reticulated porous metal condensing elements are disposed between and bonded to two gas impermeable barriers by continuous metallurgical bonds, and wherein the three-dimensionally reticulated porous metal cooling elements are disposed between and bonded directly to two other gas impermeable barriers.

A still further aspect of the invention is a method of cooling an electrochemical fuel cell comprising placing the electrochemical fuel cell in fluid communication with an air cooled condenser wherein the air cooled condenser comprises a plurality of three-dimensionally reticulated porous metal condensing elements and a plurality of three-dimensionally reticulated porous metal cooling elements, wherein the three-dimensionally reticulated porous metal condensing elements are disposed between and bonded to two gas impermeable barriers by continuous metallurgical bonds, and wherein the three-dimensionally reticulated porous metal cooling elements are disposed between and bonded directly to two other gas impermeable barriers.

A still further aspect of the invention is a flow field-bipolar plate assembly for an electrochemical cell, comprising a first and second three-dimensional reticulated porous metal flow-fields bonded directly to opposite sides of an electrically conducting gas impermeable barrier by continuous metallurgical bonds.

A further aspect of the invention is a method of delivering a gas to a fuel cell electrode comprising delivering the gas to a porous metal flow field-bipolar plate assembly wherein the porous metal flow field-bipolar plate assembly comprises an electrically conducting gas barrier and a three-dimensionally reticulated porous metal flow field bonded to one side of the electrically conducting gas barrier by a continuous metallurgical bond; wherein the gas contacts the three-dimensionally reticulated porous metal flow field and diffuses into contact with an electrode that is in gas communication with the three-dimensionally reticulated porous metal flow-field.

DETAILED DESCRIPTION OF THE INVENTION

Figure 1:
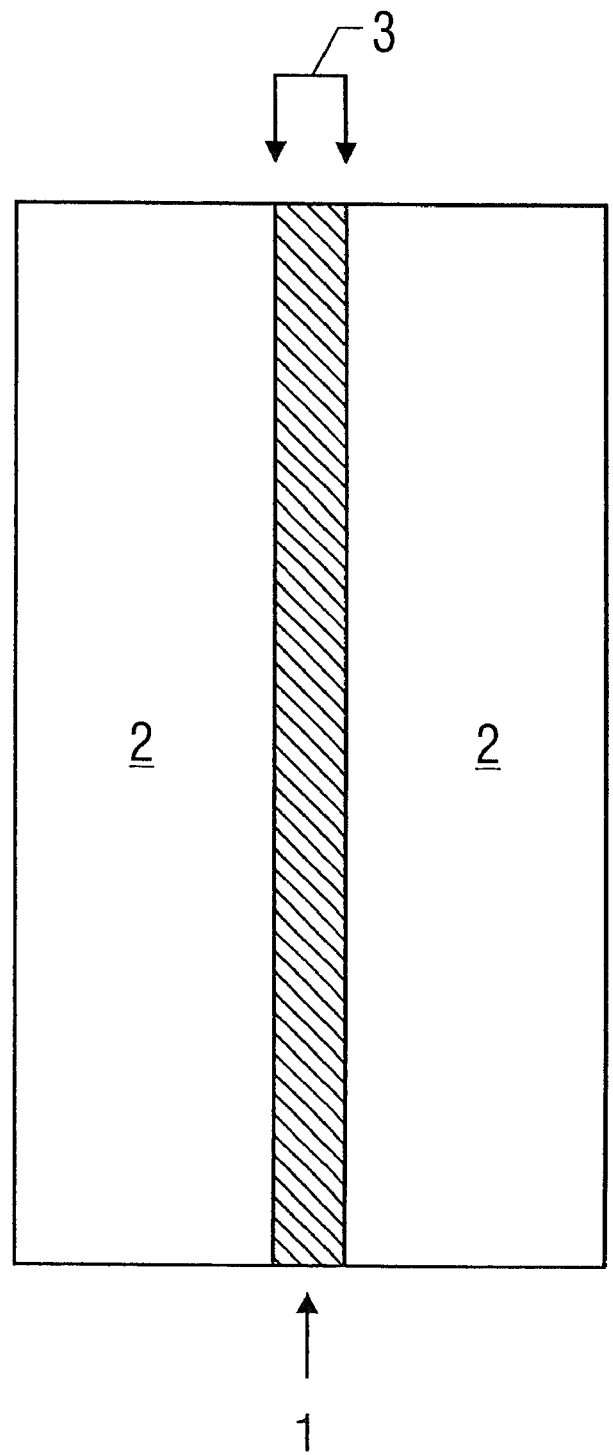
FIG. 1 shows a flow field-bipolar plate assembly comprising an electrically conducting gas barrier 1 and porous metal flow-fields 2 bonded to each side by continuous metallurgic bonds at the surfaces 3.

The present invention relates to proton exchange membrane fuel cells (PEMFCs). The following definitions apply to the specification and claims of this application:

The term "membrane-electrode-assembly (MEA)" refers to the combination of electrodes (the anode and cathode structures) and the electrolyte membrane.

The term "electrode" refers to an electrocatalytically active layer where an electrochemical reaction takes place.

The term "cathode" refers to the electrode at which oxygen is reduced and the term "anode" refers to the electrode at which fuel is oxidized.

The term "electrolyte membrane" refers to a solid membrane having an ionic conductivity.

The term "bipolar plate" refers to a gas impermeable, electrically conducting plate that separates the fuel cells.

The term "directly bonded" refers to intimate physical and electrical contact between two components that is maintained at the point of contact, even in the absence of externally applied pressure or other connectors such as spot welds.

The term "intermediate layer" refers to an electrically conducting porous layer disposed between a flow field and an electrode.

The term "continuous metallurgical bond" refers to a bond between metal components such that they are metallurgically bonded to each other throughout most of the plane of contact between the components. This excludes spot welding and methods wherein physical and electrical contact is maintained solely by means of externally applied pressure such as tie rods.

The term "monolithic" describes a component that may comprise a plurality of sub-components, but wherein physical, mechanical, and electrical contact is maintained between the sub-components, even in the absence of external applied pressure or other connectors such as spot welds.

The term "nanosized" describes a particle or entity that has dimensions smaller than about $10^{-4}$ cm.

The term "nanopore" refers to a pore or vacancy that has dimensions smaller than about $10^{-4}$ cm.

The term "flow field-bipolar plate assembly" refers to a monolithic intercell electronically conducting structure comprising metal flow fields on opposite sides of an electronically conducting gas impermeable plate or sheet acting a bipolar plate.

Sulfonated proton exchange membranes (PEMS) with fluorinated polymer backbones are particularly suitable as electrolyte membranes. They are chemically stable beyond their glass-transition-temperature of about 155° C. under almost all conditions, but can only operate as electrolytes when they contain enough excess water to allow proton mobility. Usual water vapor partial pressures under typical fuel cell operating conditions are about 0.15–0.2 atm at a total pressure of 1 atm on air at 50% oxygen utilization, about 0.3 atm with pure oxygen at 1 atm pressure, or 1 atm at 3 atm pure oxygen pressure, allow maximum operating temperatures of about 65° C., 70° C., and 100° C., respectively. Examples of sulfonated PEMs are Nafion® 117 (DuPont), in which the first two numbers of the designation refer to the equivalent weight (1100 Daltons), and the third is the thickness (7 mils, 175 μm). The thinner Nafion® 115 (5 mils, 125 μm), and 105 (equivalent weight 1000 Daltons, 5 mils) are also available.

The high-stability fluorinated backbone of the Nafion® membrane contains the same chemical structures as a combination of the Teflons® TFE (polytetrafluoroethylene), FEP (perfluoroethylene-perfluoropropylene copolymer) and PFA (perfluoroalkoxy), i.e.,

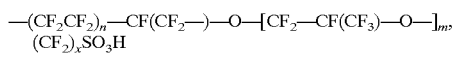

$$—(CF_2CF_2)_n—CF(CF_2—)—O—[CF_2—CF(CF_3)—O—]_m,$$
$$(CF_2)_xSO_3H$$

where the $—(CF_2CF_2)_n—CF(CF_2—)$ structures arise from copolymerization of tetrafluoroethylene and $CF2=CF—O—$ vinyl ethers. Because of the synthetic methods used, x=2, and n is normally 2–3 with m=1 for Nafion®. Examples of other membranes are chemically similar materials from the Asahi Chemical Industry Company (Aciplex®-S1004, Tokyo, Japan; m=0–2, and x=2–5), and formerly available from the Dow Chemical Company—(XUS-13204). These materials are made using slightly different chemistry and have slightly different properties, with equivalent weights of 1100, 1000, and 900 respectively. Electrolyte film thicknesses of about 100–125 μm result in cells with resistivities of about 0.1 $\Omega\text{-Cm}^{-2}$ when operating at temperatures below the boiling point of water under the particular imposed pressure conditions. Other available membranes are Nafion® 112 (1100 Daltons, 2 mils, 50 μm dry thickness), Nafion® 111 (1100 Daltons, 1 mil, 25 μm dry thickness, and GORE-SELECT® (W. L. Gore and Associates, Elkton Md.). The Gore materials have Nafion® chemistry on an inert porous support (GORE-TEX® expanded PTFE, U.S. Pat. No. 5,547,551; Barbir et al., *Abst.* 1996 *Fuel Cell Seminar, National Fuel Cell Coordinating Group,* Washington D.C., 505 (1996)) and are available in total thicknesses of 10, 20, and 40 μm, potentially giving materials with very low ionic resistance and high rates of water transport.

Other polymer electrolyte materials that may be used include sulfonated polyphenylene oxide (PPO), sulfide, sulfone (PPS), etherketone (PEEK), polybenzimidazole (PBI), polybenzothiazoles, polyaromatic polyimides, fluorinated polystyrene, polyphosphazenes, phenylsiloxanes, and mixtures containing basic polybenzazoles and acid sulfonated polyethers as disclosed in U.S. Pat. No. 6,176,984, which is incorporated herein by reference.

Electrodes of the present invention preferably comprise electrocatalysts such as transition metals or transition metal alloys. Examples of metals that may be used in the electrodes include, but are not limited to, platinum, palladium, cobalt, chromium, and ruthenium. Particularly preferred electrocatalysts comprise platinum or platinum containing alloys, particularly alloys of platinum and one or more transition metals. Alternatively, the electrocatalyst may be based on other metals such as palladium or palladium containing alloys, particularly alloys of palladium and one or more transition metals. Electrodes may comprise an electrocatalyst loaded onto a conducting support such as high surface area carbon. A typical support material is carbon black. Examples of commercially available carbon blacks are Vulcan XC-72R, Black Pearls 2000 (BP2000) (Cabot Corporation), and the common acetylene black Shawinigan Black (SB). In a particular embodiment of the present invention electrodes comprise between about 5 wt % to about 90 wt % of an electrocatalyst loaded onto carbon black.

The electrode material can be mixed with or suspended in a solution of an ionic conducting material to form an ink, paste or a putty which can be applied to a solid support to form the electrode. In one embodiment of the present invention, the solution of an ionic conducting material is a solution of an ionic conducting polymer. In a particular embodiment of the present invention, the ionic conducting material is a polymeric perfluorocarbon sulfonic acid. A particularly suitable ionic conducting material is Nafion® (DuPont).

One aspect of the present invention is a fuel cell component comprising a porous flow field and an electrocatalytically active layer applied directly onto the porous flow field. The term flow-field as used herein refers to a structure with suitable electronic and thermal conductivity, through which the gases are delivered so that they may contact the MEA, and through which reaction products may be eliminated. Ideally, the flow field should be light and should be designed so as to facilitate water and heat management. As mentioned above, conventional flow fields consist of serpentine grooves machined into graphite plates. Not only does this design add weight to the fuel cell stack because of the heavy end-plates and tie rods that are needed, but it also poses a water control problem because product water collects in the grooves and hinders gas flow through the grooves. Moreover, a large pressure differential is required to force the gas through the flow field, necessitating pressurized operation of the stack.

Porous metal flow fields according to the invention are an improvement over solid flow fields. The porous metal allows gas flow without mechanically cut grooves, has low weight per unit area, is electronically conductive and is relatively inexpensive.

Porous metals suitable as flow field material can include porous copper, porous nickel, porous aluminum, porous titanium, and porous aluminum-titanium alloys. The method of preparing the porous metal structure used for the flow field is described in U.S. Pat. No. 4,882,232, which is incorporated herein by reference. In that patent, an organic polymer foam structure is chemically decapped, or opened up, by a reactive solvent bath, a thin metal layer is sputtered onto the entire surface of the foam throughout its structure, and the resulting structure is then coated with a chosen metal by electroless plating, followed by electroplating if required. The organic polymer foam structure may be subsequently removed if required. The resulting open metal geometries may be characterized as three-dimensional networks or three-dimensional reticulated structures.

While the corrosion environment in the cell is relatively benign, such materials may still undergo disadvantageous chemical change within the cell, e.g., corrosion accompanied by dissolution, or the gradual growth of oxide films with low electronic conductivity that seriously reduce cell performance. Accordingly, the porous metal flow fields of the present invention may further comprise a protective coating layer. The protective coating layer can comprise a metal or metal oxide. Particularly preferred metals include tin, copper, nickel, aluminum, titanium, and gold. Examples of oxide layers include ruthenium dioxide, non-stoichiometric black Mageli phase titanium oxide (Ebonex™, Ebonex Technology Inc., Emeryville, Calif.), or tin oxide.

Tin is a metal on which a thick, poorly-conducting oxide film is gradually produced under PEM fuel cell operational conditions. Porous metals not containing metallic tin, but comprising a thin layer of tin oxide on its surface can be used as metal flow fields. Tin oxide, when in the form of a thin layer that is unable to grow further, has adequate conductivity and is stable in the pH range corresponding to the internal region of an operating fuel cell (Pourbaix, *Atlas d'Equilibres Electrochimiques a 25° C.*, Gauthier-Villars, Paris, 475–484 (1963)). Accordingly, one aspect of the present invention is a fuel cell component comprising a porous metal flow field having a thin layer of tin oxide disposed on the surface of the porous metal. The tin oxide layer must be thick enough to be continuous, and may be between about 1 $\mu$m and about 5 $\mu$m thick, and is preferably between about 1 $\mu$m and about 2 $\mu$m thick, and even more preferably between about 1 $\mu$m and about 1.5 $\mu$m thick.

Another aspect of the present invention is a method of constructing a fuel cell comprising a porous metal flow field and a thin layer of tin or tin oxide disposed on the surface of the porous metal flow field. Examples of suitable techniques for disposing the tin or tin oxide layer include sputtering techniques, chemical vapor deposition, laser ablation, and electroplating of metallic tin followed by oxidation in air or via anodizing, for example under PEM fuel cell operating conditions. A particular embodiment of the present invention is a method of constructing a fuel cell device comprising a porous metal flow field and a thin layer of tin oxide disposed on the surface of the porous metal flow field, the method comprising using a sputtering technique to apply a thin layer of tin oxide to the surface of the porous flow field. According to a more particular embodiment of the present invention, tin oxide is applied to the porous metal flow field using a sputtering method comprising the steps of resistively heating an amount of tin oxide such that it vaporizes and allowing the vapor to impinge onto porous metal flow field. Preferably, the sputtering method is performed at a reduced pressure. An advantageous aspect of the present invention is that the porous metal flow fields permit the formation of sputtered layers throughout their internal structure.

A further aspect of the present invention is a fuel cell component comprising a porous, i.e., three-dimensionally reticulated, metal flow field and an electrode applied directly onto the porous flow field, wherein the porous flow field comprises a thin tin oxide layer on at least one surface of the flow field of the porous metal and wherein the electrode contacts the porous metal flow field at a surface that supports the thin tin oxide layer.

According to one embodiment of the present invention, the fuel cell component comprises a porous flow field, a intermediate layer bonded directly to the surface of the flow field, and an electrode bonded directly to the intermediate layer.

According to another embodiment of the present invention, the intermediate layer comprises high surface area carbon particles such as carbon black and may further comprise a polymer. Preferable polymers include fluorinate polymers such as polytetrafluoroethylene, perfluoropethylene-perfluoropropylene copolymer, perfluoroalkoxy polymer or polyvanilidine fluoride. The amount of polymer in the electrically conducting intermediate layer is preferably between about 10 and about 60% and more preferably between about 30 and about 40% by weight. According to one embodiment of the present invention, the intermediate layer is very thin, preferably less than about 1 mm thick and more preferably less than about 0.5 mm thick. According to another embodiment, the intermediate layer is discontinuous.

This intermediate layer is alternately referred to as a "diffusion layer", "support layer" or "backing layer", and serves as a foundation for the thin active catalytic layer in contact with the electrolyte and as an electronically-conducting bridge cementing the electrode to the flow field. It may also serve as a water-rejecting layer if it contains a hydrophobic agent such as Teflon® PTFE.

Another aspect of the present invention is a method for fabricating a fuel cell component comprising the steps of bonding an intermediate layer directly to a porous flow field and bonding an electrode directly to the intermediate layer. An intermediate layer, as described above can be applied to a porous flow field by rolling, calendering, pressing, printing, spraying, brushing, electrostatic spraying, and dry or wet filtering. An electrode can also be applied to the intermediate layer by rolling, calendering, pressing, printing, spraying, brushing, electrostatic spraying, and dry or wet filtering.

In general, an intermediate layer acts as diffusional resistance in parallel with the electrode. It is therefore desirable to increase the porosity of the intermediate layer. Accordingly, a further aspect of the present invention is a method of making a gas diffusion electrode comprising the steps of applying to a substrate a mixture comprising a polymer, an electrocatalyst, and fumed silica pore-former, and then treating the electrode to remove the fumed silica pore-former.

To optimize the porosity in the electrode and the intermediate layers, pore-forming particles on the nanometer to micron ($10^{-7}$ to $10^{-4}$ cm) scale are preferred. This is much smaller than conventional porophoric crystals and making such small particles by a physical technique such as grinding is not practical. For certain materials, a chemical approach is feasible. One of these materials is fumed silica, prepared by heat-treatment of silicic acid (hydrated silica precipitated from aqueous solution). According to one aspect of the present invention, fumed silica may be used to increase the porosity of the electrocatalytically active and intermediate layers of PEMFC electrodes and thereby obtain higher performance.

Fumed silica is incorporated into the layers, and subsequently removed to create an optimized porosity. Because fumed silica is soluble in alkali as silicate, it may be washed out with a base such as potassium hydroxide or sodium hydroxide.

If the electrode contains acidic ion conducting polymer electrolyte material, and is in contact with the PEM electrolyte during the base wash, the active layer must be treated to regenerate the active form of the electrolyte. Accordingly, one embodiment of the present invention is a method of making a fuel cell component comprising the steps of applying to a flow field or an intermediate layer a mixture comprising an ionic conducting polymer electrolyte, a catalyst, and fumed silica pore-former, and treating the electrode to regenerate the active form of the electrode. The amount of fumed silica pore-former in the mixture is preferably between about 20 and about 60% and more preferably between about 35 and about 45% by weight. According to one aspect of the present invention, the fuel cell component is rinsed with an ion-exchange solution to regenerate the acid form of the ionic conducting polymer. Suitable ion-exchange solutions include dilute acids such as dilute sulfuric acid, hydrochloric acid and phosphoric acid. Subsequent rinsing with deionized water completes the treatment. If electrodes are to be used in alkaline fuel cells, the potassium hydroxide electrolyte itself removes the fumed silica and no further treatment is required.

According to one aspect of the present invention, electrodes are constructed by applying the electrode to the intermediate layer. If the electrocatalytically active material is suspended as a putty, paste, or ink as described above, it may be applied by painting one or more layers of the electrocatalytically active material onto the intermediate layer. In one embodiment of the present invention, fumed silica is co-mixed with the catalyst ink mixture and applied to the backing layer. The layer is treated to extract the pore-former and then treated with ion-exchange solution and rinsed.

According to one aspect of the present invention, gas diffusion electrodes are constructed by applying to a substrate a mixture comprising a polymer, an electro catalyst, and fumed silica pore-former, and then treating the electrode to remove the fumed silica pore-former. The substrate is preferably carbon cloth, carbon felt, or carbon paper. The pore-treated electrodes can then be hot pressed onto an electrolyte membrane to form a MEA.

Alternatively, the substrate may be a porous flow field, as described above. Minimizing contact resistance between the flow field and the MEA is an important design consideration. Direct assembly of gas diffusion electrodes onto porous flow-fields is an attractive way to minimize the contact resistance.

In a further embodiment of the present invention, the electrode material may be mixed with or suspended in a solution of a precursor of an ionic conducting material to form an ink, paste or a putty, which can be applied to a solid support to form the electrode. Such a precursor may be a suitable large-cation salt of the sulfonic acid, such as a quaternary amine salt (U.S. Pat. Nos. 5,211,984, 5,234,777, which are incorporated herein by reference). In the present embodiment of the invention, the solution of the precursor of the ionic conducting material is a solution of a resin which produces the PEM material after chemical treatment, such as hydrolysis. Of particular interest in this regard is the penultimate product of the synthesis of Nafion® (DuPont), the corresponding sulfonyl fluoride resin, which is a castable material from which films are produced which become Nafion® films after hydrolysis of the sulfuryl fluoride groups to sulfonic acid groups and hydrofluoric acid. In this case, the solid support may be the sulfonyl fluoride resin film, which will become the electrolyte after hydrolysis, e.g., by reaction with water. Since silica is soluble in hydrofluoric acid as fluorosilicic acid, the hydrolysis operation will also extract the fumed silica additive.

Introduction of pore-former into the fabrication procedure for the electrode of the oxygen gas diffusion cathodes, followed by extraction of the additive, results in an increase in the volume porosity of the active layers and in a significant decrease in mass transport resistance. The volume porosity has an optimal value. The electrode performance improvement of the optimal porosity value can be correlated in a simple manner with the improved mass transport properties of the electrode active layer. A further increase of porosity beyond the optimal value negatively influences electrode performance because of the appearance of discontinuities in the solid phase in the electrode and an increase in the active layer thickness. These respectively result in increased ohmic resistance and unfavorable gas diffusion. A negative change in the hydrophobic/hydrophilic pore volume ratio also occurs.

Another aspect of the invention is to provide a fuel cell stack that provides electrical power in a much lighter package. One embodiment of this invention is flow field-bipolar plate assembly comprising porous metal flow fields at the anode and cathode of adjacent cells with an electronically conducting bipolar plate or sheet between them acting as a gas separator. It is fabricated as a single piece so as to eliminate the problem of contact resistance.

Referring to FIG. 1, such a flow field-bipolar plate assembly comprises two porous metal flow-field components 2 representing the anode and cathode flow-fields, with an impervious electronically-conducting foil, plate or sheet 1 in between to serve as a gas barrier or reactant separator between the anode and cathode of adjacent cells. The gas barrier may comprise tin, copper, nickel, aluminum, titanium, gold, or aluminum-titanium alloy. As previously stated, the porous components are preferentially made via the method of U.S. Pat. No. 4,882,232, which results in lightweight open metal structures whose open porosity can be as high as 97%. These three dimensional reticulated metal structures may be based on metals, including tin, copper, nickel aluminum, titanium, gold, and aluminum-titanium alloys. A particularly preferred metal is nickel. They may also comprise more than one metal, e.g., copper, on which nickel may be applied. In addition, such metals may be applied by inexpensive methods, such as electroless-plating and electroplating. Further the entire assembly of the two flow-fields and the impervious electronically-conducting plate or sheet may be fabricated in one piece by application of pressure and electroplating, e.g., on a nickel foil, or by sintering under pressure after suitable reductive surface treatment to ensure correct direct metallic contact at the surfaces 3.

The bipolar plate does not directly contact the electrolyte in the PEMFC, and it should only contact slightly acid (ca pH 5–5.5) pure water. This allows some materials flexibility compared with the PAFC. The use of common metals is generally unsuccessful. The reason for this is their previously-stated tendency to grow an anodic oxide film at the cathode side, which results in increasing contact resistance with time. Aluminum, titanium, and stainless steel, i.e., chromium, show this effect, and surface treatments such as gold-plating appear to show pin-hole effects which result in underlying film growth and spalling.

Thermodynamics (Pourbaix, *Atlas d'Equilibres Electrochimiques a 25° C.*, Gauthier-Villars, Paris, 333–336 (1963)) indicate that nickel should also be unstable in regard to oxide film formation, but it behaves surprisingly well, especially under cathodic potential conditions. Under such cathodic conditions, its passive conducting oxide is the same as that present in alkaline electrolyte in the metallic nickel positive electrode current collector of nickel cadmium, nickel-zinc, and nickel metal hydride secondary batteries. Under anodic conditions, depassivation with formation of green divalent nickel ions may occur, at least early in the cell operating life. Any anions associated with relatively strong acids (e.g., fluoride from residual traces of sulfonyl fluoride groups in the PEM electrolyte, or sulfate from trace hydrolysis of PEM sulfonic acid groups) are only present in very small amounts, as is apparent from the pH of the product water. Thus, the counter ion is most likely carbonate. Even though divalent nickel ions have relatively low solubility, these ions have been found in the PEM electrolyte, with a concentration gradient determined by scanning electron microscope electron probe analysis to be from the anode to the cathode side. Such ions can slowly exchange with protons in the PEM electrolyte, reducing its ionic conductivity as a function of time, which will eventually result in cell failure. Thus protection of nickel on the anode side, for example by tin oxide coating, is required.

Similarly, thermodynamics shows that copper should always be stable in the presence of hydrogen on the anode side up to electrochemical potentials of up to 0.4 V versus the hydrogen electrode (Pourbaix, *Atlas d'Equilibres Electrochimiques a 25° C.,* Gauthier-Villars, Paris, 387–388 (1963)). However, copper will oxidize at the cathode (Pourbaix, *Atlas d'Equilibres Electrochimiques a 25° C.,* Gauthier-Villars, Paris, 387–388 (1963)), and it requires protection at the anode in case exposure to air (oxygen) occurs when the hydrogen supply to the cell anode is turned off. In this case, in the present of platinum-based electrocatalyst and water, a galvanic cell is set up with reduction of oxygen on platinum, with oxidation of copper via electrochemical reaction with water. Thus, copper must be protected against this eventuality with coatings, e.g., of nickel, followed by tin oxide.

Such structures may further comprise a protective layer of a metal or a metal oxide. Examples of protective metals include tin, copper, nickel, aluminum, titanium, and gold. Examples of protective oxides include ruthenium oxide, titanium oxide, and tin oxide. A protective layer of a suitable electronically conducting oxide, e.g., tin oxide, may be applied by sputtering or by electroplating of metallic tin followed by gas phase, wet chemical or anodic oxidation. The flow fields of the present invention, as described above, are amenable to excellent penetration by materials under sputtering conditions, and under electroless plating and electroplating conditions. It is therefore an advantage of the present invention that the protective layer can be applied to both the bipolar plate and the porous flow field simultaneously, subsequent to the construction of the monolithic assembly.

According to one embodiment, the protective layer is continuous. It may be between about 1 and about 5 $\mu$m, preferably between about 1 and about 2 $\mu$m, and even more preferably between about 1 and about 1.5 $\mu$m thick. A typical porous metal sheet 1 mm thick made by the method of U.S. Pat. No. 4,882,232 has a total internal area of about 2.5 cm$^2$ and an internal volume close to 0.1 cm$^3$. Such a volume could contain about 6 mg of nickel in the form of 1.0 molar plating solution. A 1 $\mu$m coating of nickel throughout the structure would deplete only 2.3 mg from the bath, so these methods of coating would not be limited by throwing-power.

A further embodiment of this invention is a fuel cell in which electronic contact between these and other stack components, e.g., the electrodes, and the membrane, are directly bonded together. A stack comprising such "glued up" fuel cells has the advantage of not requiring pressure to maintain contact, although some lateral support can be used to ensure sufficient strength. It will be apparent that the advantages of such a "glued-up" or "cemented" structure will be reduced weight and volume resulting from the elimination of the need for heavy, strong end-plates and tie-bars, and their replacement by lightweight structures, as well as improved electronic contact throughout, a more uniform current density, lower internal electronic resistance, and consequently higher stack power density.

Figure 2:
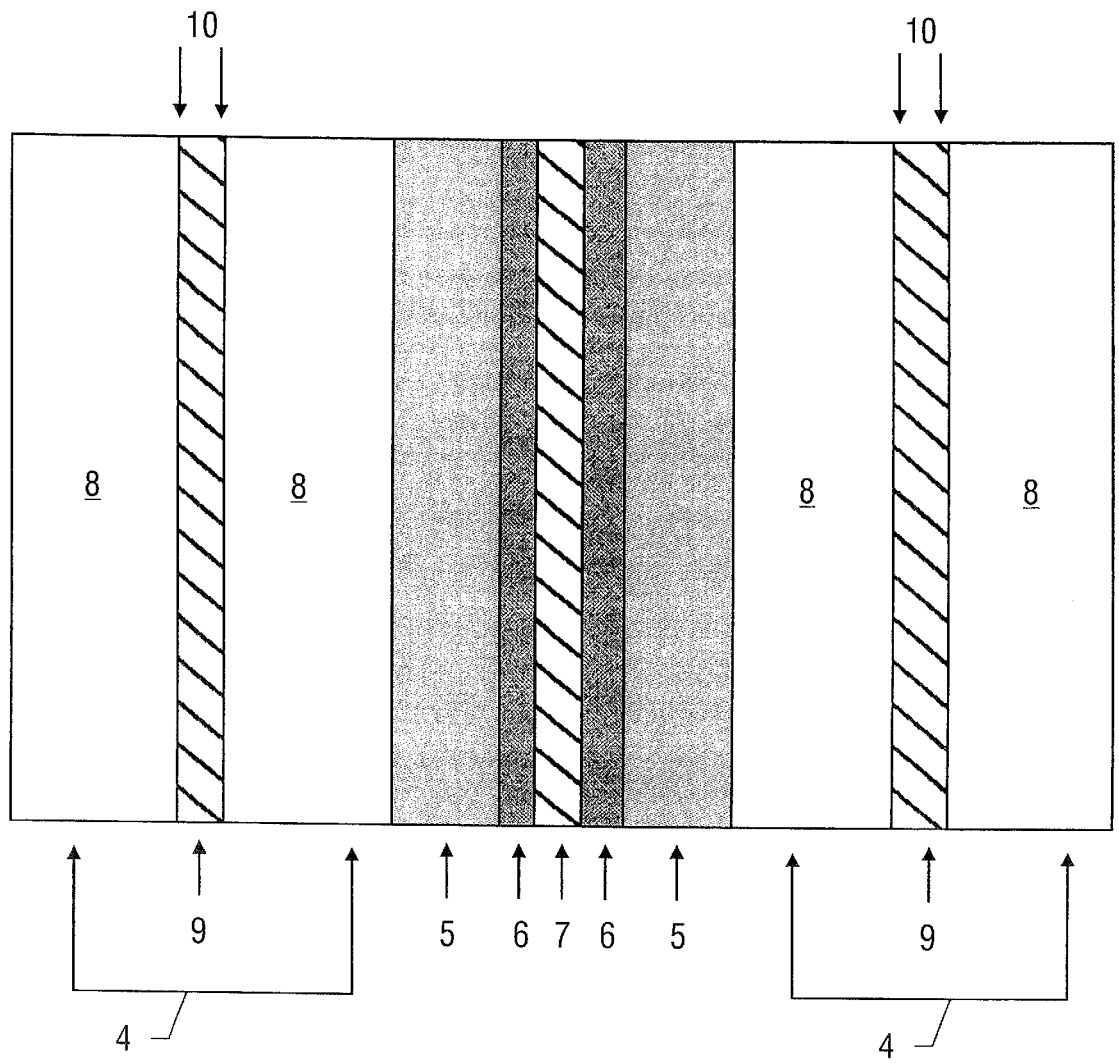
FIG. 2 shows a fuel cell comprising flow field-bipolar plate assemblies 4, intermediate layers 5, electrodes 6, and a PEM 7, wherein the flow field-bipolar plate assemblies comprise an electrically conducting gas barrier 9 and porous metal flow-fields 8 bonded to each side by continuous metallurgic bonds at the surfaces 10.

Referring to FIG. 2, one aspect of the present invention is an electrochemical fuel cell comprising monolithic electrically conducting flow field-bipolar plate assemblies 4, as described above, arranged essentially parallel to each other, electrically conducting intermediate layers 5 bonded directly to the inside surfaces of the flow field-bipolar plate assemblies 4, electrodes 6 bonded directly to the surface of the electrically conducting intermediate layers 5, and a polymer electrolyte membrane 7 disposed between and bonded to both of the electrodes 6. The electrically conducting intermediate layers are as described above.

A further aspect of the present invention is a fuel cell stack comprising a plurality of fuel cells as described above.

PEMFCs using Nafion® electrolyte chemistry should operate with a water-saturated cathode exit gas stream if it is to work effectively, since otherwise the PEM electrolyte present between and within the electrode structures will dry out and become non-conducting to hydrogen ions. This will effectively cut off the functioning of the cell. This will happen if the rate of production of water in the cell via the electrode reactions, plus the rate of introduction of any other water into the cell, is less than the overall rate of water removal by evaporation from the cell via the cathode and anode gas exit streams. Because the PEMFC shows effectively no water vapor pressure suppression, the vapor pressure-temperature relationship which must be used to establish the real behavior of the PEMFC is that for pure water at the same temperature. As the electrode reaction equations show, the PEMFC (as with all acid electrolyte cells) produces water at the cathode.

The minimum value of 2.0 for the operating oxygen stoichiometry when unpressurized or pressurized dry air is used at the cathode reactant in the PEMFC immediately fixes the exit dew point of the cathode effluent. Each oxygen molecule used in the cell gives two water molecules, so that under these conditions the water vapor partial pressures in just-saturated exiting reactants are 0.190, 0.547, 0.479, and 0.592 atm, at total pressures of 1.0, 2.0, 3.0, and 4.0 atma, corresponding to dew-points of 59.2° C., 73.8° C., 80.6° C., and 86.9° C. At these temperatures, the cathode exit will be essentially in contact with liquid water, but at the cathode entry, drying will take place unless there is an effective method for internal transfer of water from the cathode exit to the entry. In principle, this may be effected via water exchange through a thin electrolyte to a counter-flow anode reactant, stream. Cells with approximately 50 cm$^2$ active area which do not incorporate such an active method of internal water transfer will only operate in a stable manner when operating self-humidified (i.e., when supplied with dry feedstock, with humidification only by product. water) if their operating temperature is less than approximately 52° C. Part of the internal water transfer in such cells is through the plane of the membrane itself, so larger cells may require a slightly lower operating temperature.

Thus, operation at higher temperature requires either external humidification (active addition of excess water to the cell), pressurization, or both. A drawback to pressurization is that it requires part of the electrical output of the cell, and is inefficient because of the large number of molecules pressurized. Humidification also requires parasitic power, but the amount is much less than that for pressurization.

In the current density range of interest, humidified operation at about 52° C. operating temperature showed a lower polarization slope, resulting in a performance at constant current density about 50 mV more positive than that for self-humidified operation. The state-of-the art PEM electrolytes were then 125 $\mu$m thickness. This difference has been reduced to practically zero as thinner PEM materials have become available (e.g., Nafion® 111 and 112, 25 and 51 $\mu$m; GORE-SELECT™, W. L. Gore and Associates, Elkton, Md., 20 or 40 $\mu$m). Only the anode gas flow must be humidified to obtain correct performance, even at 75° C.

There are two options for atmospheric pressure stack operation. The first is to operated under self-humidified conditions at about 52° C. using an oxygen stoichiometry close to 2.0. The other is to maintain a sufficient supply of water to the anode side of the cell to ensure that liquid water is always present there under the chosen cell operating temperature conditions. This allows operation at up to about 75°–79° C. In all cases, and especially when it is not in use with the active cooling operating, it is preferable that the fuel cell be protected from direct exposure to low-air-mass sunlight to ensure that its temperature does not exceed that of normal operation. Thus, temperature and water management are important considerations in fuel cell stack design.

One embodiment of the present invention is to cool the fuel cell stack using direct-air cooling. Direct air-cooling preferably utilizes high-surface area internal cooling plates, preferably of metal to reduce thermal transfer and electrical resistance. In this case, the PEMFC stack serves as its own heat-exchanger.

Porous metal is particularly suitable for use as cooling plates. According to one embodiment of the invention, the cooling plates comprise three dimensionally reticulated porous metal, as described above, as cooling plates.

Figure 3:
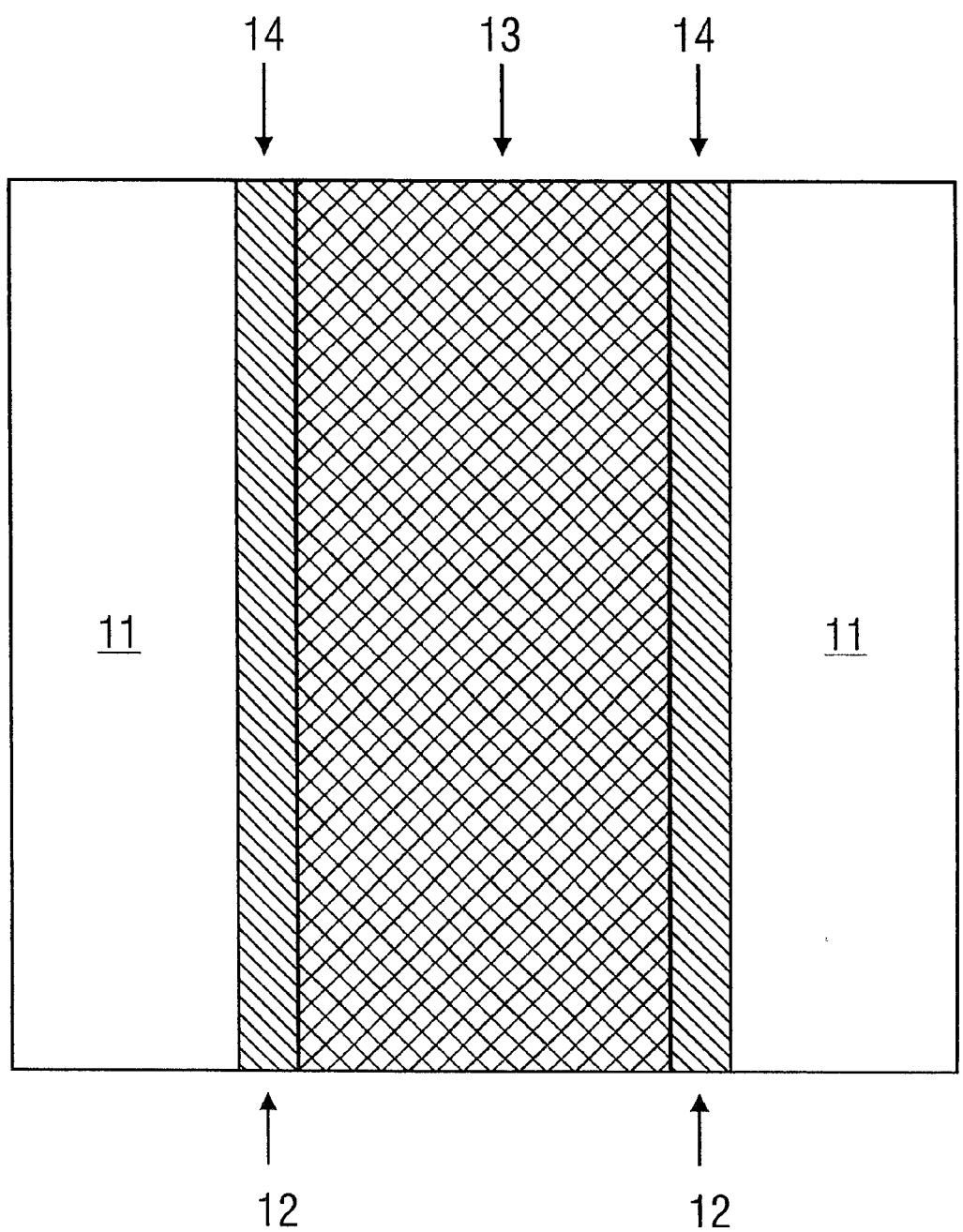
FIG. 3. shows a flow field-bipolar plate assembly comprising porous metal flow field components 11 metalurgically bonded to impervious electronically conducting plates or gas barrier 12. The cooling plate comprises a porous metal cooling field 13, disposed between two gas barriers 12.

One aspect of the present invention is a fuel cell component comprising a one-piece porous metal flow field-bipolar plate assembly combined with a cooling plate. According to one embodiment, the flow field-bipolar plate assembly comprises porous metal flow field components 11 metalurgically bonded to impervious electronically-conducting plates or gas barriers 12 (FIG. 3). The cooling plate comprises a porous metal cooling field 13 metalurgically bonded between the gas barriers 12.

The bond between the porous metal flow field component 11 and the gas barrier 12 is preferably a continuous metalurgical bond. According to one embodiment, the porous metal flow field and the cooling barrier are bonded together by electroplating. According to an alternative embodiment, the cooling barrier and the flow field are bonded by sintering.

The gas barrier and flow fields are as described above. The cooling field may comprise a three dimensional reticulated structure. The metal is preferably selected from tin, copper, nickel, aluminum, titanium, gold, and aluminum-titanium alloy. The gas barriers may comprise a metal foil and are preferably selected from tin, copper, nickel, aluminum, titanium, gold, and aluminum-titanium alloy, with nickel being particularly preferred. Because the cooling field only contacts air, it can be sealed to the gas barrier using soft solder, making good thermal and electrical contact at interface 14.

A further aspect of the present invention is a fuel cell stack comprising two electrically conducting endplates and a plurality of electrochemical fuel cells disposed between the endplates, wherein the fuel cells comprise porous flow field-bipolar plate assemblies combined with cooling plates, as described above. The electrochemical fuel cells may comprise a first and second monolithic electrically conducting flow field-bipolar plate assemblies arranged essentially parallel to each other such that an inside surface of the first flow field-bipolar plate assembly is facing an inside surface of the second flow field-bipolar plate assembly. The flow field-bipolar plate assemblies may be electrically and mechanically connected by intervening layers. The intervening layers may comprise a first electrically conducting intermediate layer bonded directly to the inside surface of the first flow field-bipolar plate assembly, a second electrically conducting intermediate layer bonded directly to the inside surface of the second flow field-bipolar plate assembly, a first electrode disposed on the surface of the first electrically conducting intermediate layer, a second electrode disposed on the surface of the second electrically conducting intermediate layer, and a polymer electrolyte membrane disposed between and bonded to both of the electrodes. The bipolar separator plates are preferably of the type described above, comprising an electrically conducting gas barrier and a porous metal flow-field bonded to each side of the electrically conducting gas barrier by continuous metallurgical bonds.

The fuel cell stack of the present invention is a "glued-up" or "cemented" design. All parts of the stack, including the complete cooling system minus the air blower, are included in the specified weights and volumes of the stack. One embodiment is a 5 kW atmospheric pressure stack, this includes endplates for current take-off. A stack with 265 $cm^2$ cells would have a current of about 185.5 A at 0.7 V per cell. Nickel-plated aluminum endplates only 3 mm thick allows for collection of this current on central buses with about 1 mV voltage drop across the plate, which can in any case be ribbed (if required) for efficient current collection.

Air-cooling of a self-humidified stack (52° C. operation) is feasible to 40° C. ambient. It requires a 2.0 mm thick 97% porous copper foam plate with a characteristic radius of 0.75 mm, with spherically reticulated interlocking nets with a diameter of about 0.65 mm per reticulation unit (distance between parallel faces of hexagons). The gas flow-fields are of the "direct assembly" type consisting of nickel foams or interlocking nets. The materials used are 97% porous, with a characteristic radius of 0.1 mm, but are otherwise identical in structure to the much coarser copper foams used in the cooling plate.

In one embodiment of the present invention, the bipolar plate has an active area of 265 $cm^2$, and is rectangular, with active area dimensions of 9.3 cm×30 cm. To minimize the cooling work requirement, the cooling flow is at right angles to the long axis of the stack. The hydrogen foam flow-field is about 0.5 mm thick. This is feasible because of the low flow-rate of hydrogen (21.5 $cm^3 \cdot s^{-1}$ per cell at 0.7 $A \cdot cm^{-2}$). The internal volume of the anode flow-field in each cell is about 12.9 $cm^3$. The hydrogen anode is fed from a manifold at one corner of the rectangular flow-field, which is operated dead-headed. It has a provision for a vent or bleed at the diagonally opposite corner of the flow-field. The volume of the bleed manifold is about 4.9 $cm^3$. It is known that the hydrogen anode is essentially reversible to current densities up to the region of 2.0 $A \cdot cm^{-2}$, even at anodes with platinum loadings as low as 0.02 $mg \cdot cm^{-2}$ (in the absence of carbon monoxide and other poisons). The anode will also operate reversibly up to at least 90% hydrogen utilization. If 99.9% pure hydrogen is used as feedstock, impurities will reach 90% levels in the electrode and bleed manifold after operation for 780 s at 0.7 $A \cdot cm^{-2}$. If bleeding occurs at this point, 1.9 $cm^3$ of hydrogen will be lost, i.e., 0.01%. If bleeding is performed at more frequent intervals, the hydrogen losses rapidly increase, e.g., to 0.35% at 194 s. A reasonable compromise is to operate to 50% utilization, at 431 s, which results in a loss of 0.1%. The bleed time to replace the gas in the electrodes and bleed manifold at the rated anode operating pressure at 0.7 $A \cdot cm^{-2}$ will be 0.8 seconds. The bleed valve, located in one of the endplates in-communication with the bleed manifold, will operate automatically.

The cathode nickel foam flow-field is like the anode, but is about 1.0 mm thick. To simplify the manifolding, the cathode feedstock is fed along the long axis of the flow-field, which has a rather low pressure drop at the pertinent flow rates (1.2 $m \cdot s^{-1}$).

The plate is 32.8 cm×10.1 cm overall. The three foams are separated by two nickel foils, each 0.025 mm (1 mil) in thickness. The three foams are a single unit. It is also bonded to the endplates, using the same technique. The internal manifolding and bolt retention holes are cut out of the foam sandwich, which extends to the edges of the plate. The plate edges and manifolding areas are sealed with 0.4 mm of resin. The bolt-holes are sealed with 3 mm of resin.

The individual weights of components are as follows: foils (total thickness, 0.005 cm), 13.9 g; foams (total thickness 0.35 cm) 29.2 g; resin 11.6 g (density 1.2 g-cm$^{-3}$). The ratio of active area weight to total weight is 1.49. The total weight of each "minimalist" plate is 54.6 g.

Most of the weight (about 250 g-m$^{-2}$) and thickness (ca. 0.45 mm) of many MEAs derive from the lightweight carbon cloths used as supports for the backing layer. The directly-applied MEAs (essentially glued to the flow-fields by the conductive backing layer) eliminate these cloths, and extend to all cell edges (including those for the tie-bolts) and are sealed into the resin. The weight of MEAs is 11.7 g (at 400 g-m$^{-2}$).

According to this embodiment, the total weight of each cell (plate plus MEA) is 66.3 g. The total weight of repeat parts in the 40-cell stack is 2,652 g. The 3 mm thick nickel-plated aluminum endplates (with 4 mm chamfered edges) weigh a total of 527 g, and the eight 0.4 cm diameter retaining bolts (0.3 cm steel with insulated polymer coating) and associated insulating washers weigh 109 g. The lightweight retention is only to ruggadize the stack, since the scaling throughout, including the direct formation of electrode structures on the nickel foams, is not particularly high-strength. It is however more than adequate to avoid either electrical or thermal problems of contact resistance. The bolt-holes passing through the stack (each 1 cm diameter) have been allowed an effective area equal to 180% more than their true area to allow for any "shadowing" effects. There are six bolts within the active area and two in the air manifold. The reason for placing the retaining bolts through the active area was to enable the use of a lightweight end-plate, which would otherwise have shown bowing effects (as well as being larger in area, hence heavier) if the bolts had been outside the stack edges. This would also not allow the stack to be within the required specification for power per unit volume.

The reactant inlet tubes (one 1.6 cm diameter tube for air, one 0.8 cm diameter for hydrogen) are located in communication with the manifold in one end-plate, and the hydrogen bleed valve is in the other. The total weight of the stack, including all parts except for the reactant inlet tubes, bleed valve, cooling shroud, fan, electric motor, and controls, would be 3.288 kg, giving 1.52 kW (net) per kg on this basis. The total stack height would be 15.1 cm, so that the net power density would be exactly 1.0 kW per liter.

97% porous copper foams have suitable thermal and electrical characteristics for use as cooling plates. A rectangular cell and cooling plate may be used. According to one embodiment, the aspect ratio for the 10.1 cm×30 cm cell is 2.94, with cooling along the long edge. The overall area of the flow field-bipolar plate assembly is 10.1 cm×32.8 cm. The cell components consist of a 1.0 mm thick cathode foam, a 0.5 mm thick anode foam, two 0.025 mm nickel foils on either side of the cooling foil, and a MEA directly applied to the foams. The MEA, with its two backing layers, active layers, and the 40 mm (0.04 mm) PEM electrolyte is about 0.1 mm thick with the carbon cloth layers removed. The total cell thickness is therefore about 1.65 mm, without the cooling plates, and before slight compression. A final thickness of 1.625 mm is nominally assumed. The total thickness of the 40 cells is therefore 6.5 cm. With the endplates, the thickness becomes 7.1 cm. The required power density should be 1 kW per liter, hence the permissible height of the stack is 15.1 cm. Thus, the total available cooling channel area is 8.0×30 cm, i.e., 240 cm$^2$. Another foil is required for the cooling plate, but since all parts are slightly compressed during assembly, its thickness is ignored.

According to one embodiment, there is one cooling plate per cell. Hence the cooling plate thickness is 2.0 mm. The ratio of internal area to superficial area for this plate is 3.6 (for 97% porous). The pressure drop is 4.75 cm/H$_2$O for the more open foam. Since the characteristic length of the foam is now similar to that of the channel width (the thickness of the cooling plate), the wall effect will be apparent, (the wall area is 36% of the open area). This will increase the worst-case power requirement. In the absence of experimental data with a system of such complex geometry, it is reasonable to increase the value by about 50% to about 200 W, i.e., 3.9% of stack power output.

According to another embodiment, the air-flow controller is governed by a feedback mechanism using information from thermocouples in the stack, placed e.g., in the anode flow-field.

Since the stack is marginally over-designed (total active area 274.3 cm, rather than the assumed value of 265 cm$^2$), its total gross electrical output should be about 5.3 kW. Thus, the stack should have a net dc power output of close to 5 kW, since the cathode flow power requirement is expected to be appreciably less than that for cooling. The cooling load requirement will be about 5.8% of net output. The efficiency requirement (55% based on the lower heating value, LHV, of hydrogen) requires operation at 0.690 V at 0.999 hydrogen utilization (the hydrogen lost by the impurity bleed). Proposed operation at 0.70 V corresponds to 55.7% gross efficiency. However, after allowing for parasitic power, the net LHV efficiency will be only 52.7%.

Alternatively, if the device is not cooled using a temperature gradient appropriate to self-humidified operation, humidification may be in the simplest and most effective manner. For self-sufficient operation, this will require the use of a condenser to remove some of the water exiting from the anode for recycling.

According to one embodiment of the present invention, humidification is used to increase the required ΔT to make cooling more efficient. Since the hydrogen anode is essentially reversible, collected product water (and extra water for humidification) can be passed to the anode manifolding, where it will find its way into the cell. According to one embodiment, a wicking arrangement may be also provided as needed.

According to another embodiment, a heat-exchanger operates as a condenser so water can be recovered for recycle. A stack operating at 72° C. using evaporative cooling with a properly designed condenser with a 40° C. ambient entry temperature and 51.5° C. exit temperature will require quite a large volume of air. Thus, a stack cooling system design problem in fact becomes replaced by a condenser design problem, in a system of greater complexity than one which is directly air-cooled. However, the cooling flows can be minimized in the Evaporatively-Cooled Stack or Version II Stack, and are indeed considerably less than those for the Air-Cooled Baseline Stack.

According to one aspect of the present invention, humidified stack is further cooled via evaporative cooling of water. According to one embodiment of the invention, the stack is evaporativly cooled and the hydrogen reactant is maintained at a slight overpressure, so liquid water passes through the electrolyte membrane. This over-pressure may be supplied from either a pressure cylinder or a metal-hydride bed. Even though complete evaporation may occur on the cathode side, the membrane does not dry out since it is being continuously supplied with water.

According to one embodiment, a stack operating at 72° C. using evaporative cooling with a properly designed 51.5° C. condenser operating over a 32° C. ΔT at the condenser inlet (40° C. ambient, 72° C. cathode exit temperature) and a ΔT of 11.5° C. at its outlet (i.e., ΔT approximately equal to 20° C. overall) will require a total amount of cooling air which is considerably less than that for the air-cooled plate operating over a ΔT of 12° C., after correction for the sensible heat carried away by the exiting cathode air stream at an oxygen stoichiometry of 3.0.

Figure 4:
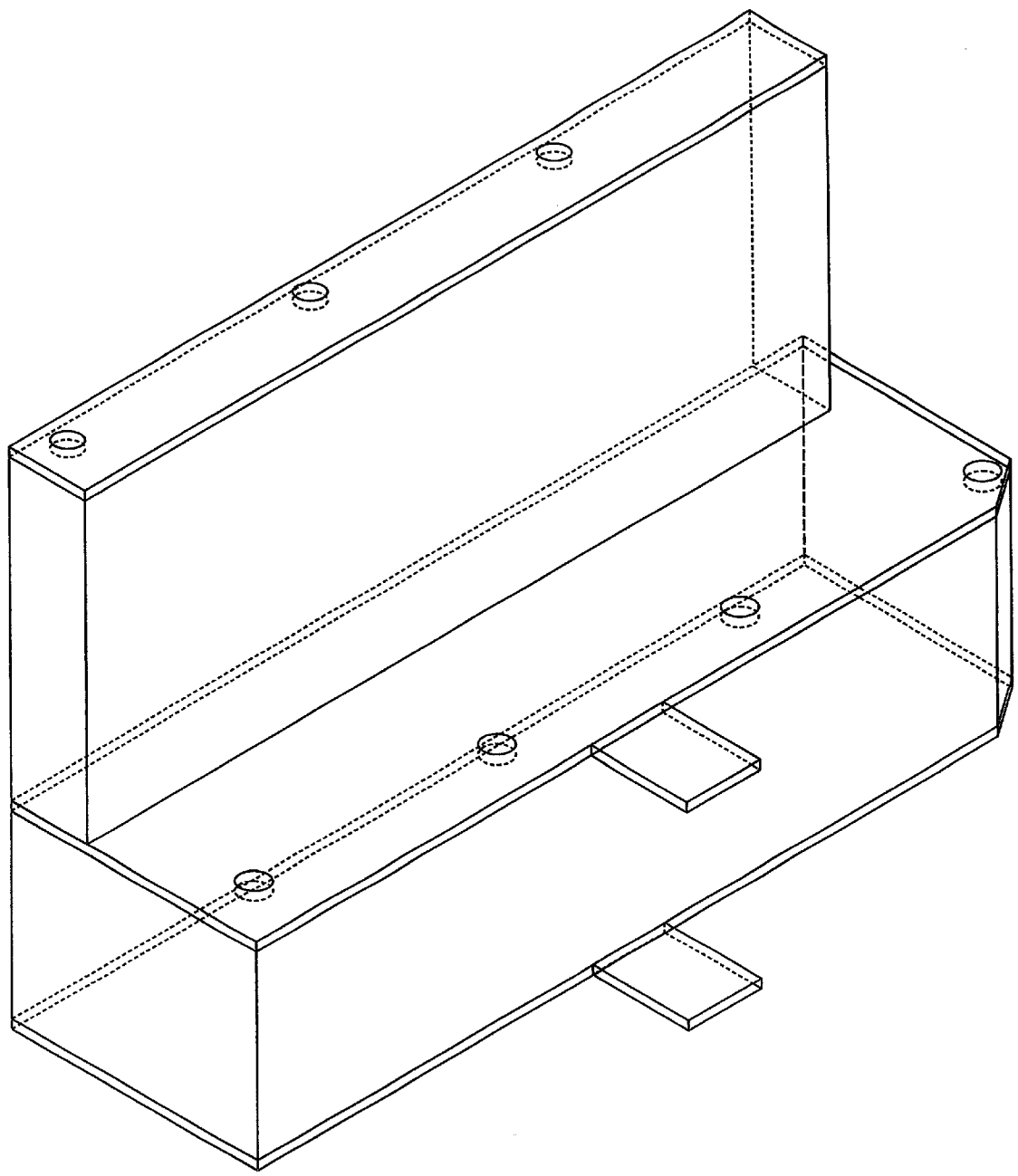
FIG. 4 is a schematic view of complete 5 kW Version II assembly. The fuel cell stack is on bottom and an air-cooled condenser is on top. According to one embodiment, the height is 20.5 cm, the width 10.7 cm, and the length 32.8 cm.

The condenser is disposed separate from the fuel cell stack, as depicted in FIG. 4. If the condenser is to be a separate unit, it is not necessary to using a long, rectangular stack. One embodiment is a square stack (16.7 cm×16.7 cm active area, containing 5, tie-bolts) comprising the same cathode foams, foils (one per cell, eliminating the cooling foil), and MEAs as those already described. This embodiment further comprises a 0.75 mm anode foam with 0.3 mm deep grooves covering 50% of the area, each filled with wicking material would be used. To allow a water manifold to feed the wicks down the whole of one side of the stack perpendicular to the cells, the gas manifolding arrangements are similar to those previously described.

According to another embodiment, the condenser components are constructed according to the same methodology of the monolithic fuel cell stack components described above. According to a particularly preferred embodiment the same areas are used, except for the provision of the cooling water manifold, which extends the overall cell area. According to one embodiment, the overall outside dimensions are 18.2 cm by 18.9 cm, with a triangular cutout, this time 1.4 cm×1.4 cm, on the corner of the air inlet manifold, on the same side as the cooling water manifold. The latter extended down the side to the hydrogen bleed manifold, and was 15.3 cm×0.3. It was sealed on the outside with 0.4 mm of resin, but communicated directly with hydrogen in the anode. The cell thickness is 0.1875 cm and the stack height was 7.5 cm (8.1 cm including 0.3 cm thickness endplates). The weight of each cell (8.7 g resin, including five retaining holes in the active area as before; 7.1 g foil, 13.66 g nickel foam, 12.0 g of MEA, and 5.0 g or organic wick material) is 46.5 g, with a total of 1,858 g for stack repeat parts. The 0.3 mm thickness endplates add 530 g, and an (optional) wick occupying the evaporative cooling manifold adds 45.1 g, giving a total weight of 2,481 g, including five bolts weighing 47.1 g. The overall volume is 2.84 liters, giving 1.8 kW per liter and 2.0 kW per kg for the stack alone.

According to one embodiment the same arrangement as the stack previously described is proposed is used, with elimination of one foil and the air-cooling plates in the fuel cell stack. The dimensions of anodes and wicks remain as above. In this stack, the condenser has the same area as the active cells (without the hydrogen and air inlet manifold area), is stacked in series. This results in an economy in weight.

A particular embodiment uses the same thickness components as those given immediately above in the active fuel cell stack. Its area is slightly larger because of the liquid water manifold along one long side (e.g., on the side next to the hydrogen inlet manifold). This adds an extra area of 0.6×30.8 cm to each cell, which requires external sealing with resin, and has a 0.2 cm×30 cm slot for the manifold wicking. The weight of individual components per cell are: foils, 7.2 g, foams 13.35 g, resin 9.95 g, MEA 12.2 g, wicks (in anodes) 5.0 g; total 47.7 g. The total amount of wicking material in the manifold is 54.0 g. The active cells have a height of 7.5 cm.

According to one embodiment of the present invention, the cooling system sits in series with the active stack cells. It has the same number and thickness of foams as the cathode, each with one foil and one 2 mm cooling cell. Because of the high rate of heat transfer compared with an air cooling plate, the length of the cooling flow channel can be reduced in overall area. According to one embodiment, this can be reduced to 25% of the fuel cell area. The plate dimensions (with edge seals on the long dimensions for cathode exit gas, on the short dimension for cooling air) are 30.8 cm×3.125 cm. The total weight of foils is 2.13 g per cooling cell, of foams 8.01 g, and of resin, 10.3 g, i.e., 20.44 g per unit, or 817.6 g for 40 cooling cells, 12.1 cm in height (assuming zero component compression). The two endplates of the fuel cell stack (one chamfered over its perimeter, the other shared with the cooling stack, partly unchamfered) weigh 540 g. The endplate for the cooling stack (also assume to be nickel-plated aluminum, 3 mm thick, and chamfered) weighs 74 g. Eight bolts passing through both the active and cooling stacks, 3 shorter ones passing through the active stack alone, and two passing through the active stack air manifold, adds, 94 g. The total height of the overall system is 20.5 cm. Thus, the total weight of the system is 3.48 kg, and its volume is 4.03 liters. The complete delivers 1.44 kW (net) per kg, and 1.24 kW (net) per liter, within specifications. It requires 40.7% of the cooling air of the Baseline Stack under standard conditions. This, together with the shorter, flow-channels, reduce the pressure drop by a factor of about 8 under these conditions. This and the lower volume throughput reduce the parasitic power by about a factor of 20 (to about 15 W) compared with the final value for the Baseline Stack. From 25 to ca 65 W will be required at higher ambient temperatures, depending of the oxygen stoichiometry. Since the stack is capable of 5.3 kW, it can be backed off to 5.0 kW net plus the power density, and can supply its parasitic power required and still be within the required 55% LHV efficiency value (0.690 V at 0.999 hydrogen utilization). This is even true if hydrogen crossover is counted (estimated at 0.7% at 0.7 A-cm$^{-2}$), which reduces hydrogen utilization to 0.992.

The condensed water can be collected in a pan or sump, and directly picked up by the internal wicking system of the fuel cell, either by direct wicking into the hydrogen-filled cooling water manifold along the stack side, or via water injection into the manifold. The air exit manifold to the condenser would be a 20.5 cm high box, 10.1 cm wide to the fuel cell stack, and 3.125 cm wide to the condenser, occupying 400 cm$^3$ or less, and weighing about 70 g. It may also be able to produce a somewhat higher performance than the self-humidified Air-cooled Baseline Stack, since it will have very efficient internal humidification.

The cooling system was designed for an extreme ambient of 40° C., but it will in fact function at temperatures up to 50° C. (i.e., 122° F.) with higher cooling flow and lower stoichiometries. This will result in an increase in parasitic power requirements (to about 55 W).

The Baseline System (self-humidified, air-cooled) contains 0.234 m$^2$ of MEA per kW. The weight of the nickel foils is 111.2 g per kW, with 233.4 g of metal foam (133.4 g of copper, 100.0 g nickel). The weight of resin is 58 g per kW. The materials cost of the metal constructional parts (211.2 g nickel, 133.4 g copper) is 1.27¢ per kW for nickel at the "expected" price of $6.00 per kg and 18¢ per kW for copper (60¢ per lb.). The aluminum (66¢ per lb.) endplates cost 15¢ per kW. The Version II system contains 0.244 m$^2$ of MEA per kW, 204.5 g of nickel per kW ($1.23 per kW), 42.7 g of copper (6¢ per kW), and a total of 614 g of aluminum (18¢ per kW). The cost of the resin is a few cents per kW in each case.

The cost of future PEM electrolyte material will fall as new materials become available. The key to a low-cost system is that for the metal parts and for fuel cell assembly. The materials costs for these parts (including resins) fall between $1.30 and $1.60 per kW for the Baseline System and Version II. In contrast to the cost of the catalyst and PEM material, this is certainly acceptable. Porous metal sheets are made in various ways, according to the chemical and physical properties of the metals. Refractory metals and alloys must be first made in sponge or fiber form. Powders can be made by chemical reduction or metal salts by alkali or other electropositive metals, e.g., titanium sponge. Fibers are generally made from chopped wire. Metals which can be electroplated from aqueous solutions are a special case, since they can be plated on to a suitable electronically-conducting high-surface area "mold" from a plating bath with high throwing power. The "mold" commonly used is a blown organic foam of the type used for thermal insulation, which has been treated according to the teaching of U.S. Pat. No. 4,882,232, first by sputtering a metal following solvent decapping, by plating a metal which can be deposited by direct chemical reduction (electroless plating), followed by electroplating if required. Nickel, and more particularly copper, are among such metals.

The foam with x=0.045 cm and with 97% porosity and surface area per unit volume of 26.9 $cm^2$-$cm^{-3}$ has an effective thickness of 11 $\mu$m. This represents about 90 Coulombs of charge per $cm^2$ for a 1 mm thick reticulated foam, i.e., about 3000 s plating time at 30 mA-$cm^{-2}$. At 2.0 V plating voltage, only 0.5 kWh of electric power, and about 0.25 kg of nickel is required per $m^2$. Such foams are used in today's nickel-cadmium and nickel metal hydride batteries as the current collector and support for the active material in at least the nickel electrode (and sometime the cadmium electrode). It replaces the older, heavier sintered Mond (ex-carbonyl) nickel powder. Nickel-cadmium batteries typically are priced at $800 per kWh, and the cost of the foam to the battery manufacturer is in the region of $100 per kWh. A typical nickel electrode has a capacity of 35 mAh-$cm^{-2}$ (at 1.2 V), so the cost per $m^2$ is about $40, or $8 per kW in the fuel cell. Making a foam attached to a foil (by plating) is no more costly. In larger production quantities, costs should fall, since the ultimate materials cost is only about 15% of the final cost.

The self-humidified approach requires a flow field-bipolar plate structure with an anode foam, an anode foil, an air cooling foam, and a cathode foil. Since the foil to air-cooling foam to foil only contacts air (and no water from the cell or even electrolyte) in this design concept, the low-technology concept can be for a "club sandwich" structure with very low-technology soft-soldered contacts between the foils and the copper air-cooling foam. This will be sufficient for both thermal and electrical conduction. The minimum requirement for solder will be about 50 g per $m^2$ (10 g-$kW^{-1}$) for the foam described in that section, or 10 g-$kW^{-1}$. Thus, the weight of the conceptual self-humidified stack, which requires two such structures (one on each side of the air-cooled foam) would increase by only 20 g-$kW^{-1}$.

The condenser of Version II requires two foils on each side of a cathode exit gas foam, each of which in turn contacts a copper cooling foil. Neither double structure can be effectively made by plating, but such double structures are not even necessary. Each condensation cell only requires a very good thermal contact to the neighboring exit cathode reagent cell, so it is only there that solder is required. The physical contact between one side of the copper cooling foam and the foil of the next condenser cell for cathode effluent gas is easily made by the proposed retention bolts. Since the cooling cell and condensation cell are monolithic, this gives no significant heat-transfer problem.

EXAMPLE 1

Figure 5:
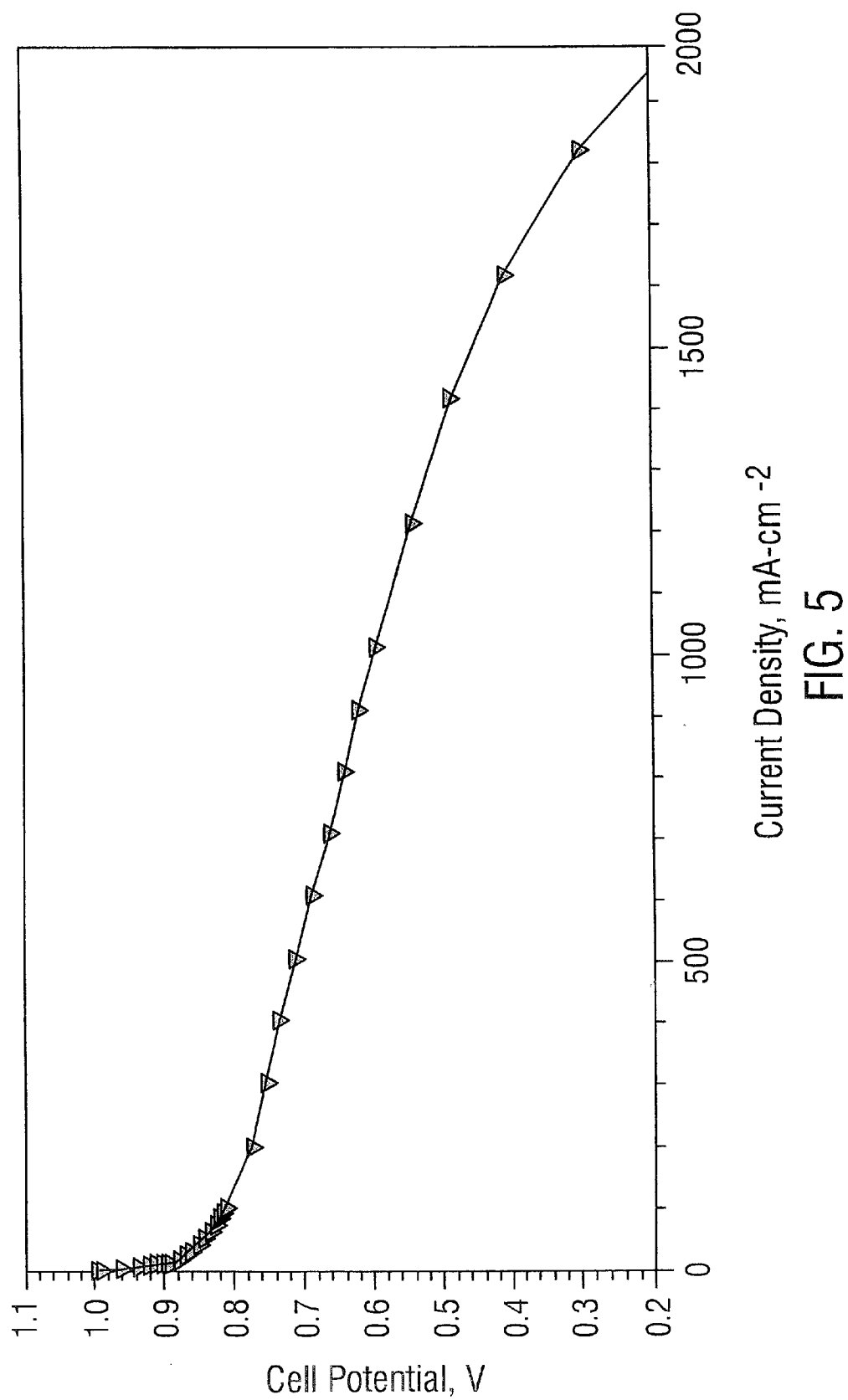
FIG. 5 shows potential-current density plot for MEA with 3.9 mg-cm$^{-2}$ Pt electrodes and Nafion® 112 membrane, 5 cm$^2$ cell, 70° C., 1.0 atma, humidified hydrogen and air.

Variations of the gas diffusion layer thickness, type of carbon black, the amount of PTFE in the active layer, and the amount of Pt supported on carbon were used to determine the combination of factors required to achieve highest performance. The best-performing early electrodes were those with a support layer loading of 10 mg-$cm^{-2}$ carbon (acetylene black), and a catalyst layer with 4.0 mg-$cm^{-2}$ platinum as 60 wt % platinum on carbon, with a PTFE content of 6 wt %. Electrodes prepared using the dry method showed very promising results when tested in small 5 $cm^2$ cells, and were able to reproduce performances previously achieved. FIG. 5 shows the current-potential dependence for a cell with an MEA using Nafion® 112 electrolyte and 3.9 mg-$cm^{-2}$ platinum electrodes. The steady-state cell potential over 100 hours was 0.68 V at a current density of 0.7 A-$cm^{-2}$. This is only 20 mV lower than the target performance; however, this cell was operated under humidified conditions.

Figure 6:
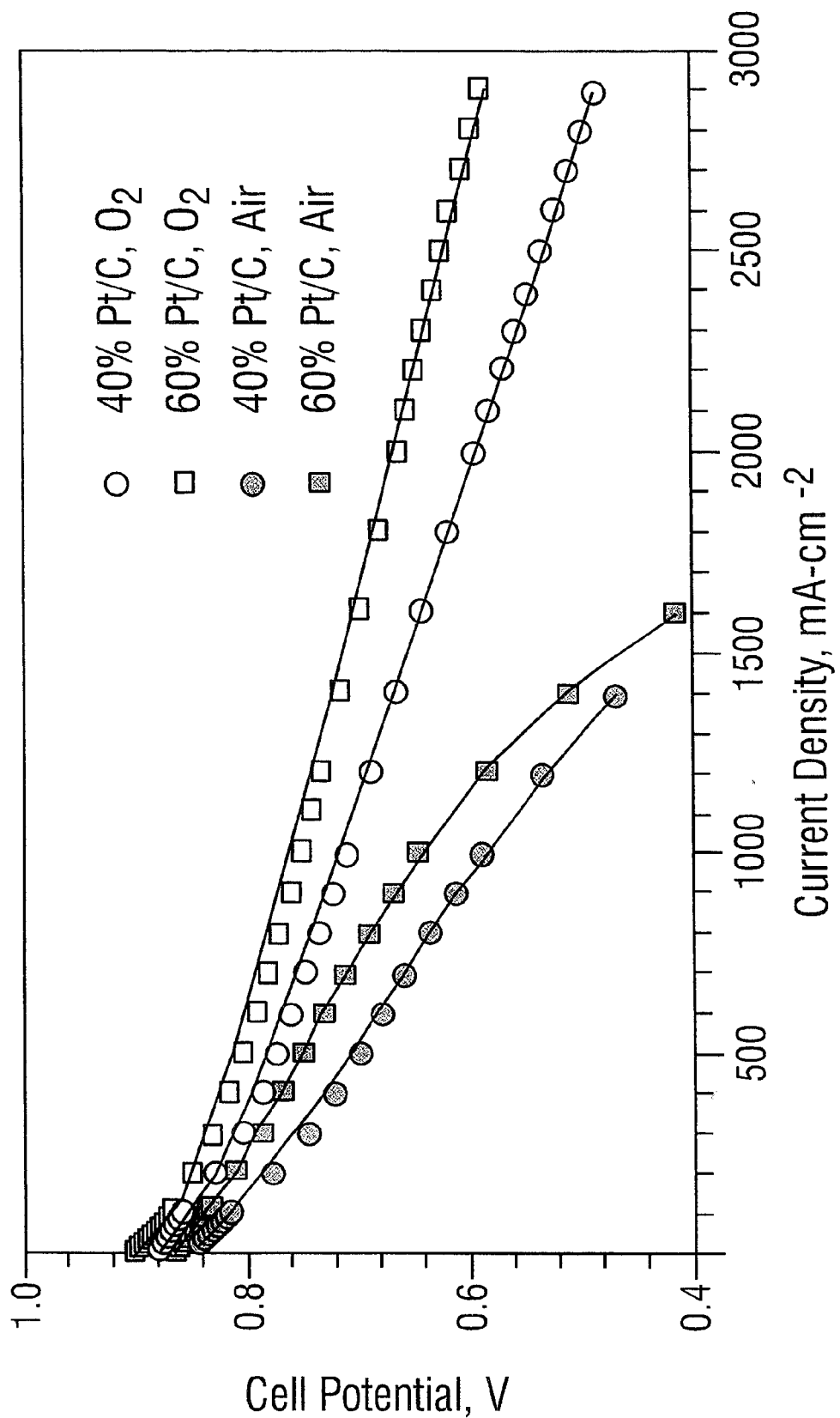
FIG. 6 shows potential-current density plots for cells with differing wt % Pt on C electrocatalyst loadings. 5 cm$^2$ cell, cathode Pt loading 1.4 mg-cm$^{-2}$, anode loading 0.3 mg-cm$^-$2, 20 mm GORE-SELECT® membranes, 50° C., 1.0 atma, humidified hydrogen/air.
Figure 7:
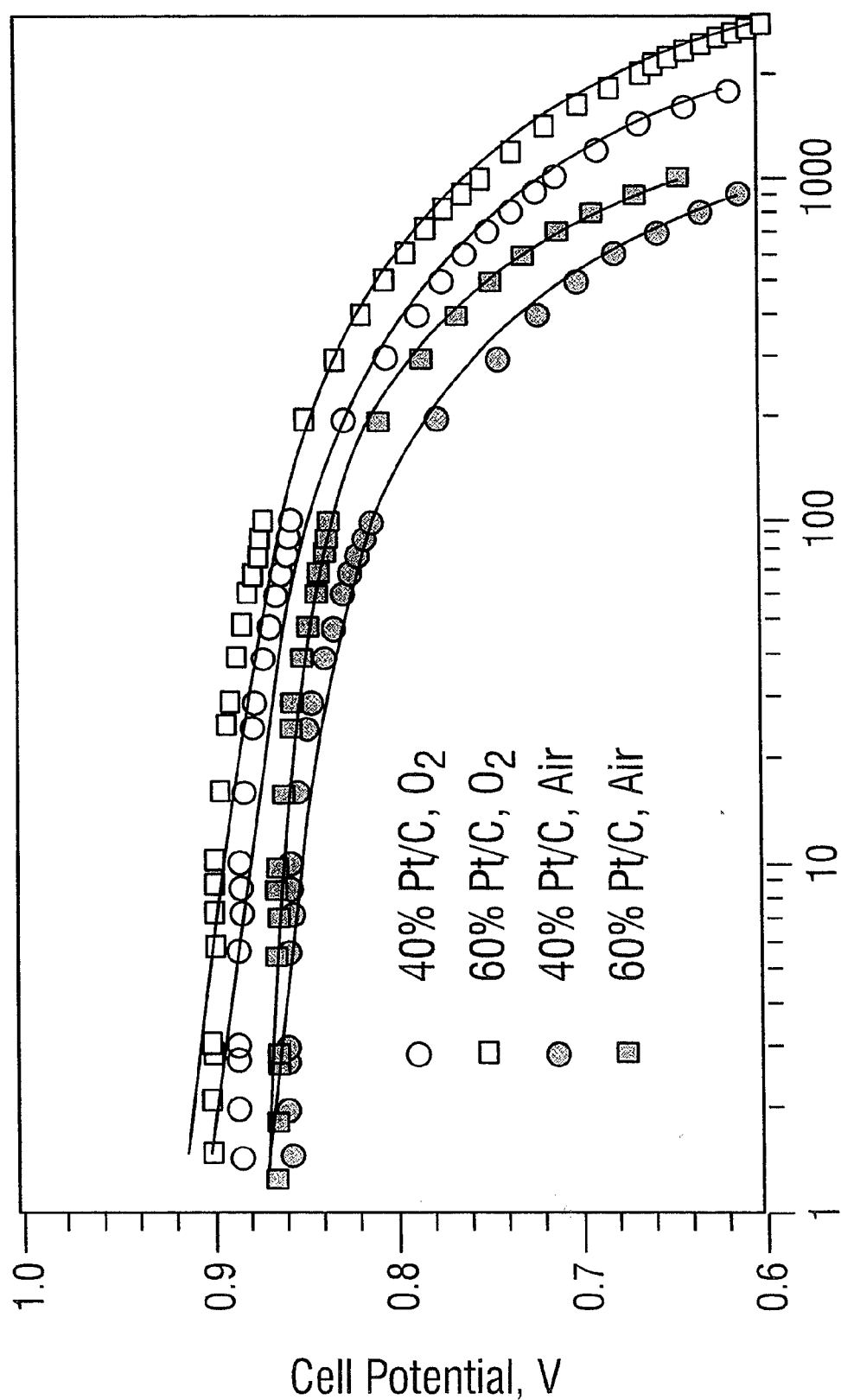
FIG. 7 shows Tafel plots for the data from FIG. 6.

The effect of changing the Pt loading of the supported catalyst was then investigated in some detail using the GORE-SELECT™ (U.S. Pat. No. 5,547,551) (W. L. Gore and Associates, Elkton, Md.) 20 $\mu$m thick membrane. Cathodes with total platinum loading of 1.4 mg-$cm^{-2}$ but with differing wt % platinum on carbon ratio on Vulcan XC-72R furnace black (Cabot Corporation) were prepared and tested in 5 $cm^2$ test cells. The anode Pt loading was maintained at 0.3 mg-$cm^{-2}$. The cell potential vs. current density plots are presented on FIG. 6. The results show that an MEA with 60 wt % platinum on carbon electrocatalyst shows a ca. 50 mV higher potential at constant current density than one with 40 wt % platinum on carbon electrocatalyst. The improvement mainly results from the higher platinum utilization in the 60% platinum on carbon electrocatalyst (FIG. 7). Newer results with higher BET surface area platinum (80 $m^2$-$g^{-1}$) exceeds 0.78 A-$cm^2$ at 0.7 V.

EXAMPLE 2

Figure 8:
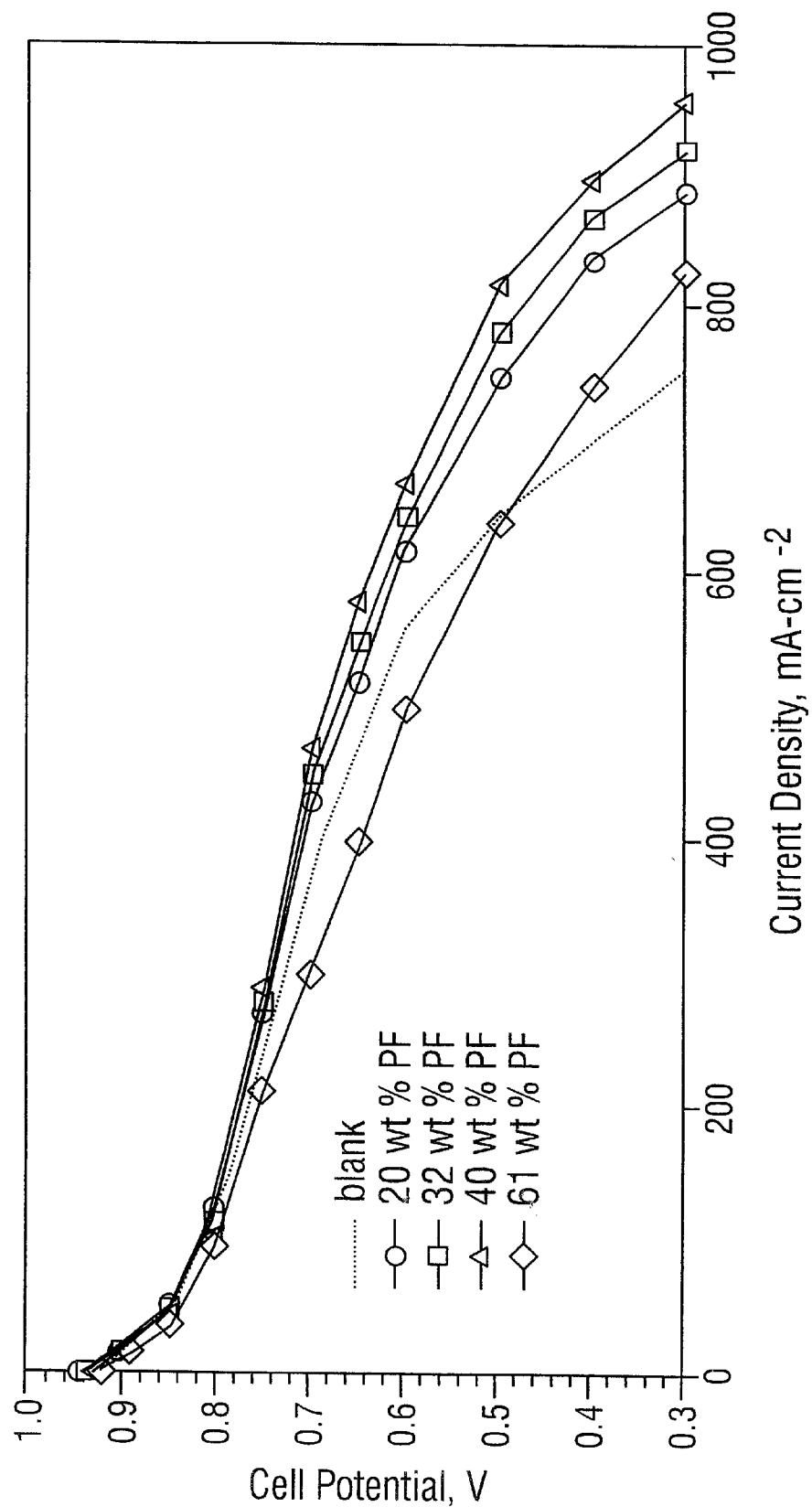
FIG. 8 shows potential-current density plots for 1.2 mg-cm$^{-2}$ (cathode), 0.05 mg-cm$^{-2}$ (anode) hydrogen/air cells with different weight % of pore-former used to prepare cathode active layers.
Figure 9:
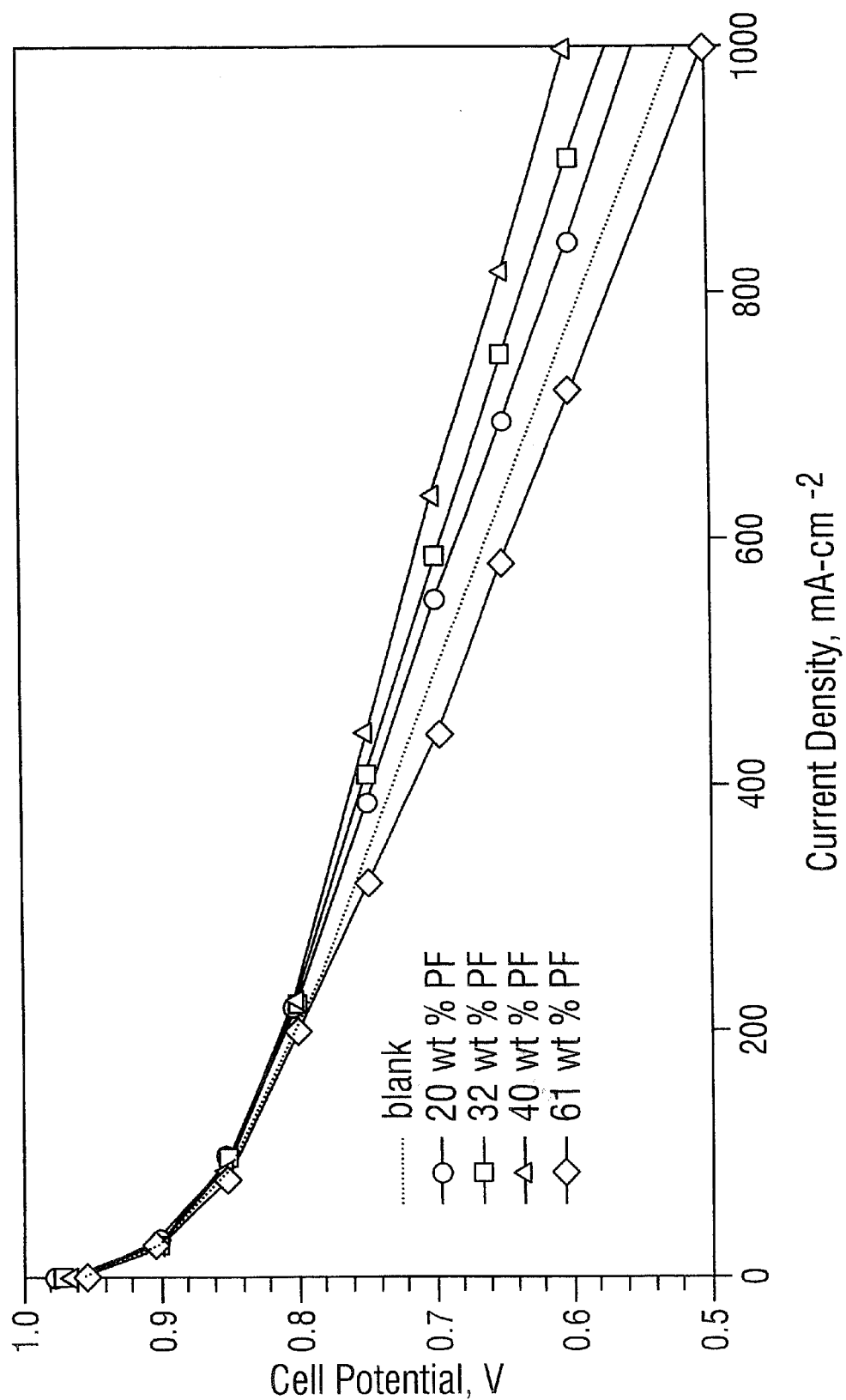
FIG. 9 shows potential-current density plots for hydrogen/oxygen cells with different weight % of pore-former used to prepare cathode active layers.
Figure 10:
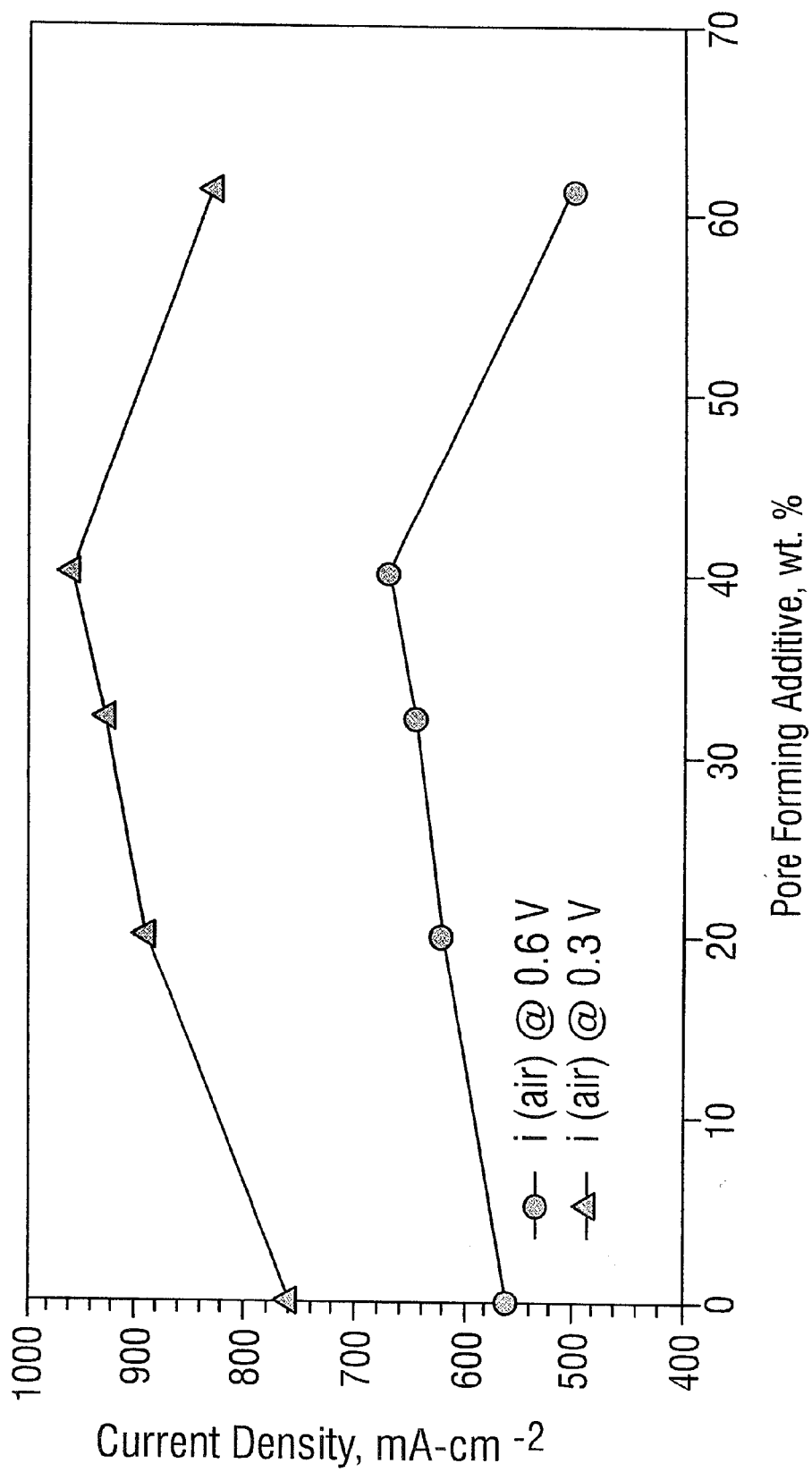
FIG. 10 shows current density (at constant V) vs. wt % of pore-former. 50 cm$^2$ hydrogen/air cells.
Figure 11:
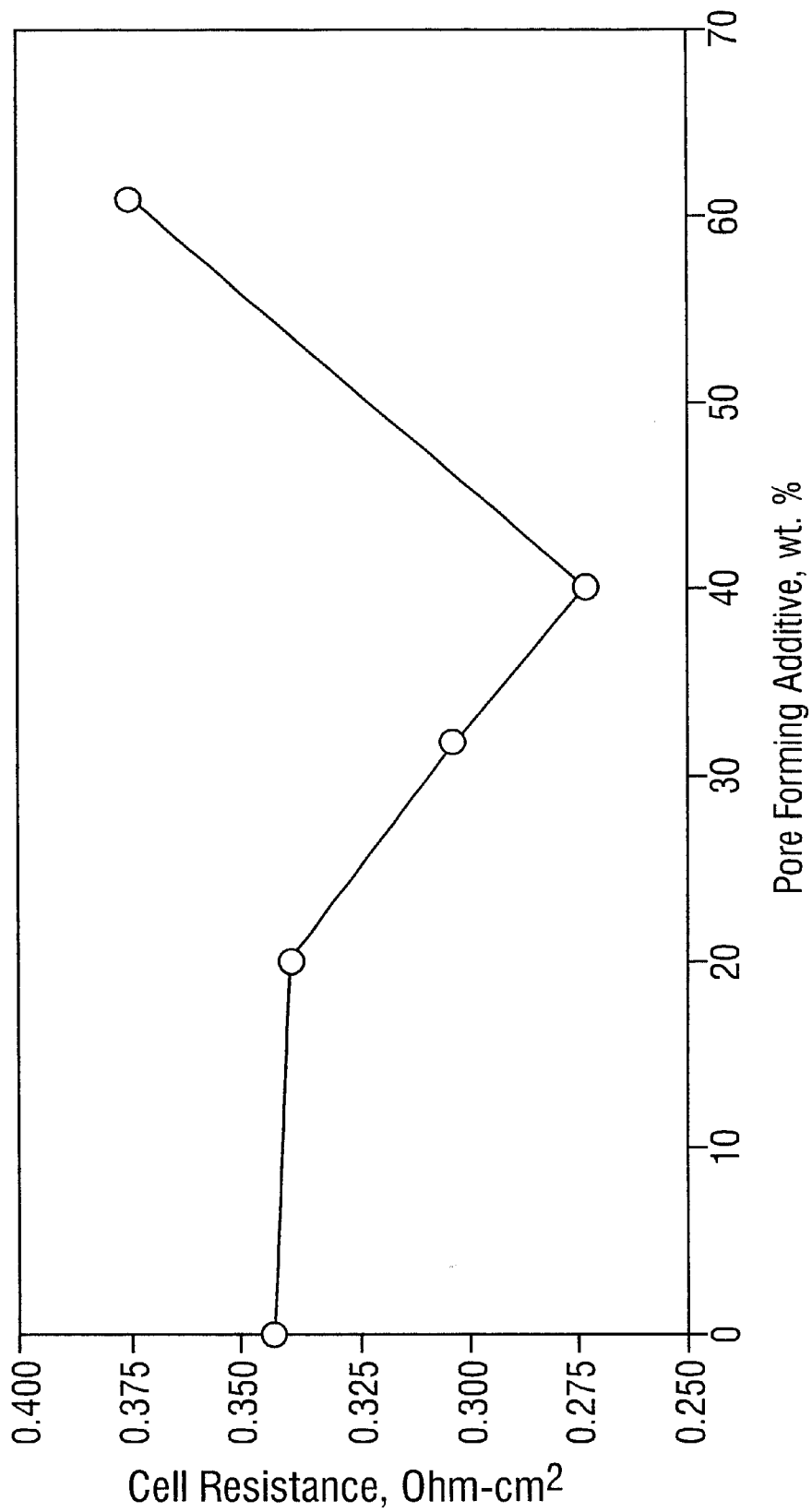
FIG. 11 shows the Ohmic resistance vs. amount of pore-former in cathode active layer. 50 cm$^2$ hydrogen/oxygen cells.

PEMFCs with gas diffusion electrodes prepared with 1.2 mg-$cm^{-2}$ (cathode) and 0.05 mg-$cm^{-2}$ (anode) were studied to determine the effect of proprietary porophoric or pore-forming (PF) additives in the cathode active layer in amounts varying from 20 to 60 wt %. The pore-former was added to the catalyst-Nafion® mixture (ink), which was followed by ultrasonic agitation. After painting the active layers onto the substrate, the electrodes were treated to extract the pore-former. MEAs of 50 $cm^2$ active area were fabricated by hot pressing of these cathodes and low-platinum-loading anodes onto Nafion® 112. Their performance was evaluated at 50° C. with humidified hydrogen, oxygen, and air at atmospheric pressure. FIG. 8 shows the hydrogen-air cell potential versus current density for the MEAs as a function of the PF loading. The results show that the performance improves when the amount of PF is increased to a level of 40 wt %. However, a further increase in the quantity of PF results in a reduction in performance. FIG. 9 shows the hydrogen-oxygen cell performance for the above group of MEAs. The influence of the amount of pore forming additive on mass transport processes in the active layer of the oxygen electrode may be evaluated from both sets of data. FIG. 10 shows the current density generated by hydrogen-air PEMFCs at two different cell potentials as a function of amount of PF. It appears that the optimal amount of PF is 40 wt % both at 0.6 V and at 0.3 V. FIG. 11 shows the influence of the amount of PF on ohmic resistance in the MEAs studied, as calculated from the slopes of the linear part of the potential vs. current density plots while operating on hydrogen and oxygen. Because the same membrane (Nafion® 112) and MEA structure was used in each case, the only variable parameter was the amount of PF used in the preparation of the active layer of the cathodes. The results show the same optimal value (40 wt %) of PF at 0.6 V (FIG. 10).

Introduction of PF into the fabrication procedure for the active layer of the oxygen gas diffusion cathodes, followed by extraction of the additive, results in an increase in the volume porosity of the active layers and in a significant decrease in mass transport resistance. It was found that the volume porosity had an optimal value. The electrode performance improvement of the optimal porosity value could be correlated in a simple manner with the improved mass transport properties of the electrode active layer. A further increase of porosity beyond the optimal value negatively influenced electrode performance because of the appearance of discontinuity in the solid phase in the active layer and an increase in the active layer thickness. These respectively resulted in increased ohmic resistance and unfavorable gas diffusion. A negative change in the hydrophobic/hydrophilic pore volume ratio also occurred. At optimal PF loadings, the current density at 0.7 V increased from 370 mA-cm$^{-2}$ to 480 mA-cm$^{-2}$.

EXAMPLE 3

To fabricate lightweight bipolar components, metal-based structures were examined. Aluminum bipolar hardware is only in contact with pure water in the PEM, but it is under electric field conditions, and develops a non-conducting oxide film more or less rapidly. Stainless steel and titanium are similar, although their oxide films develop more slowly. Tin oxide should be thermodynamically stable, and it is also conducting.

Figure 12:
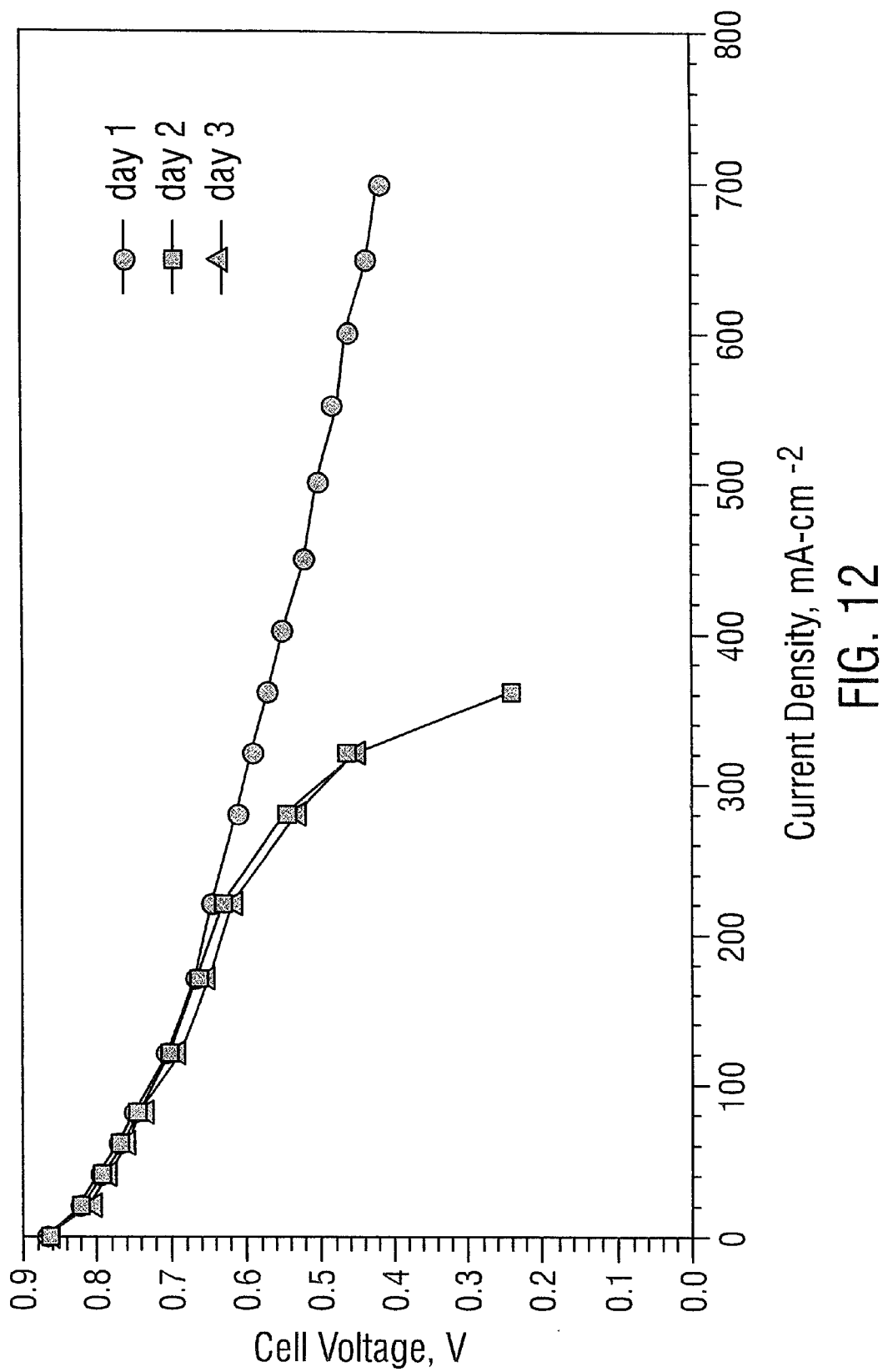
FIG. 12 shows the dependence of current-voltage characteristics of PEM fuel cell with aluminum flow fields on the time of operation, temperature 50° C., atmospheric pressure, externally humidified hydrogen/air.

Aluminum:

Tests using uncoated aluminum showed rapid decline of cell performance within a few days (see FIG. 12). This was due to oxidation of the aluminum, resulting in decreased conductivity of the contact surfaces. Tests using electroless gold plating on aluminum were then performed. The deposits obtained were examined using electron microscopy to verify the presence of a low-porosity film and if good contact existed between the deposit and the substrate. A gold-plated aluminum cell structure was constructed and tested. After approximately 100 hours of operation, the gold film failed in many places due to growth of the aluminum oxide film underneath, presumably at defects in the film. All further attempts to plate gold, e.g., on to aluminum, gave initially stable results, but the presence of pinholes results in growth of an underlying oxide film, which caused the gold film to peel.

Figure 13:
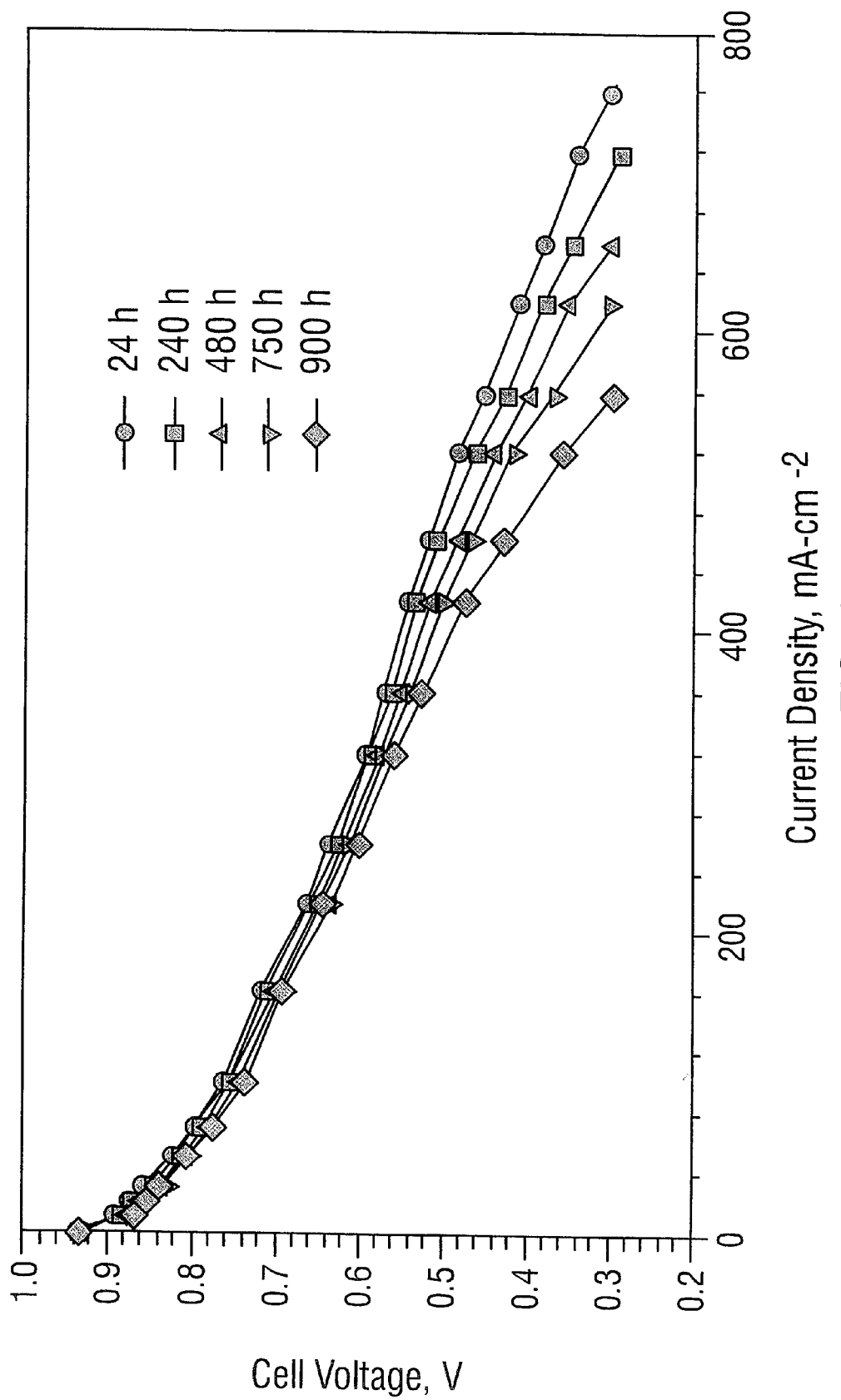
FIG. 13 shows the long-term performance of MEA with 0.4 mg-cm platinum loading E-TEK electrodes and Nafion® 112 membrane, 50° C., 1.0 atma, externally humidified hydrogen/oxygen.
Figure 14:
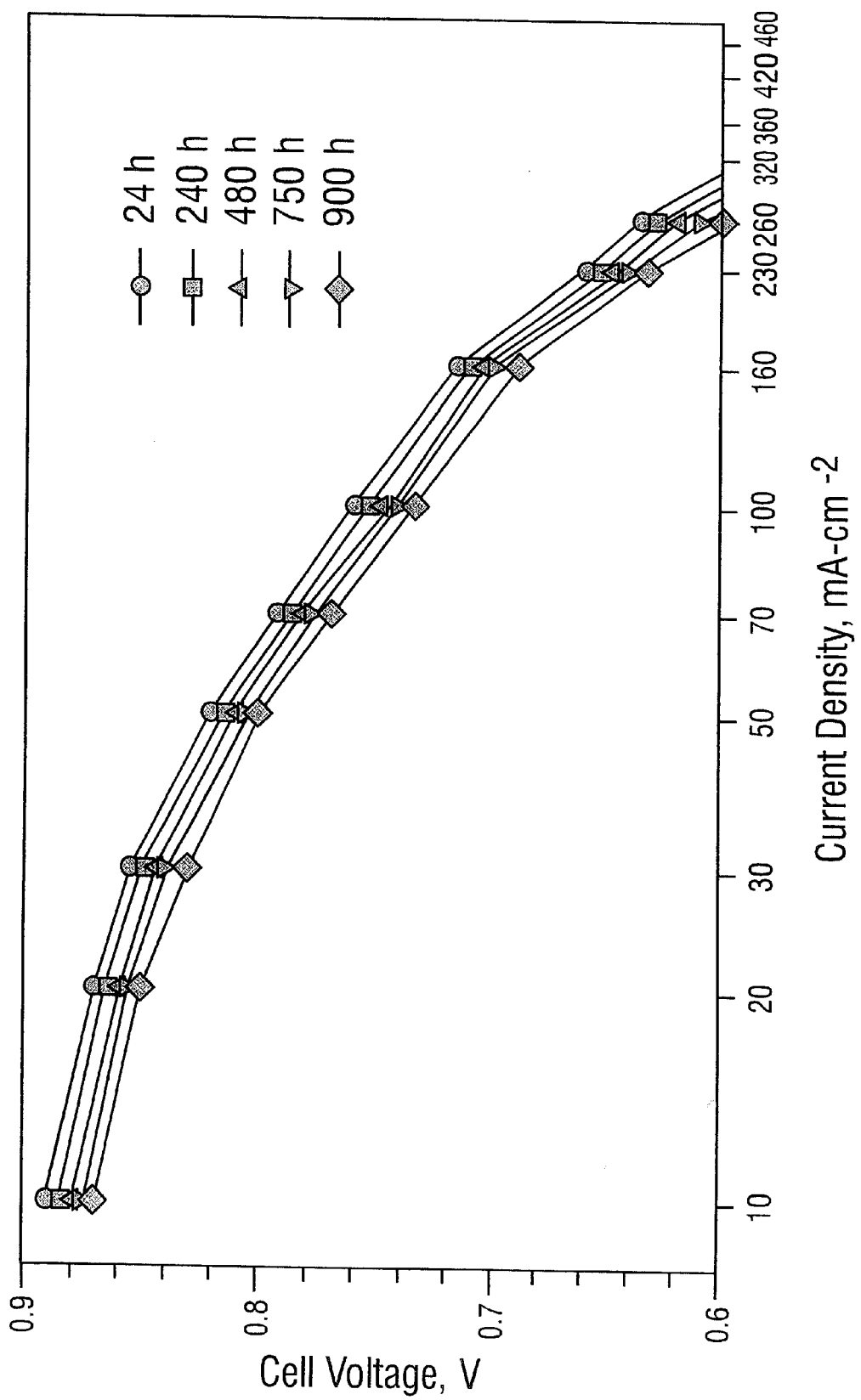
FIG. 14 shows Tafel plots for the data from FIG. 16.

Stainless Steel:

Experiments were then carried out with stainless steel fixtures. A 900 hour endurance test showed little deterioration in performance. FIG. 13 shows the dependence of the cell potential vs. current density behavior on operating time. Losses are mainly due to higher polarization resistance at high current densities. The catalytic activity of the electrodes was not much affected, as is shown in FIG. 14. Preliminary tests with a titanium nitride coating on the stainless steel showed that the coating was not stable and peeled off quite rapidly.

Figure 15:
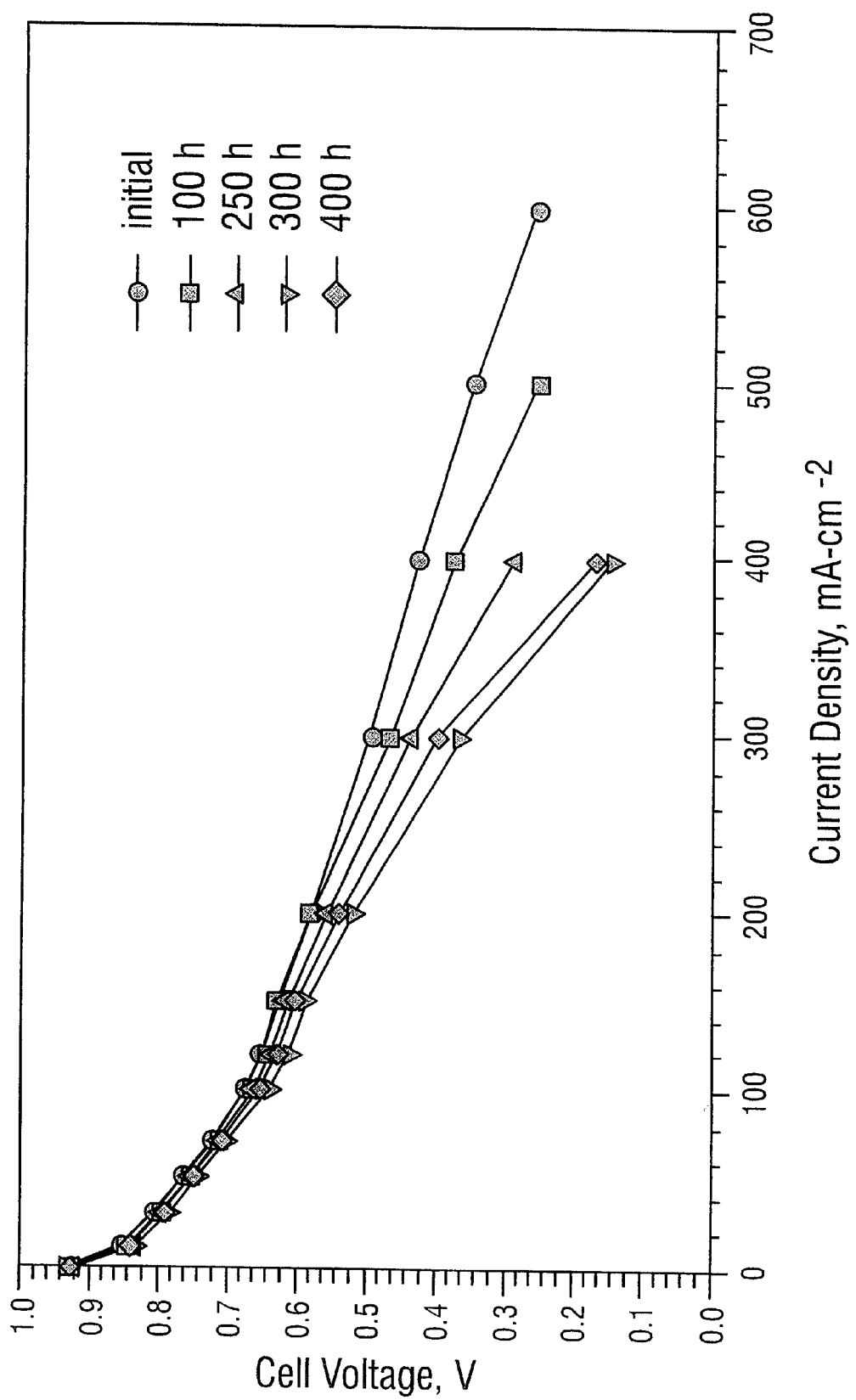
FIG. 15 shows potential-current density plots as a function of operating time at 0.6 V for a 5 cm$^2$ MEA with 0.4 mg-cm$^{-2}$ E-TEK electrodes and Nafion® 115 membrane in titanium nitride coated stainless steel flow-fields. 50° C., 1.0 atma, externally humidified hydrogen/air.
Figure 16:
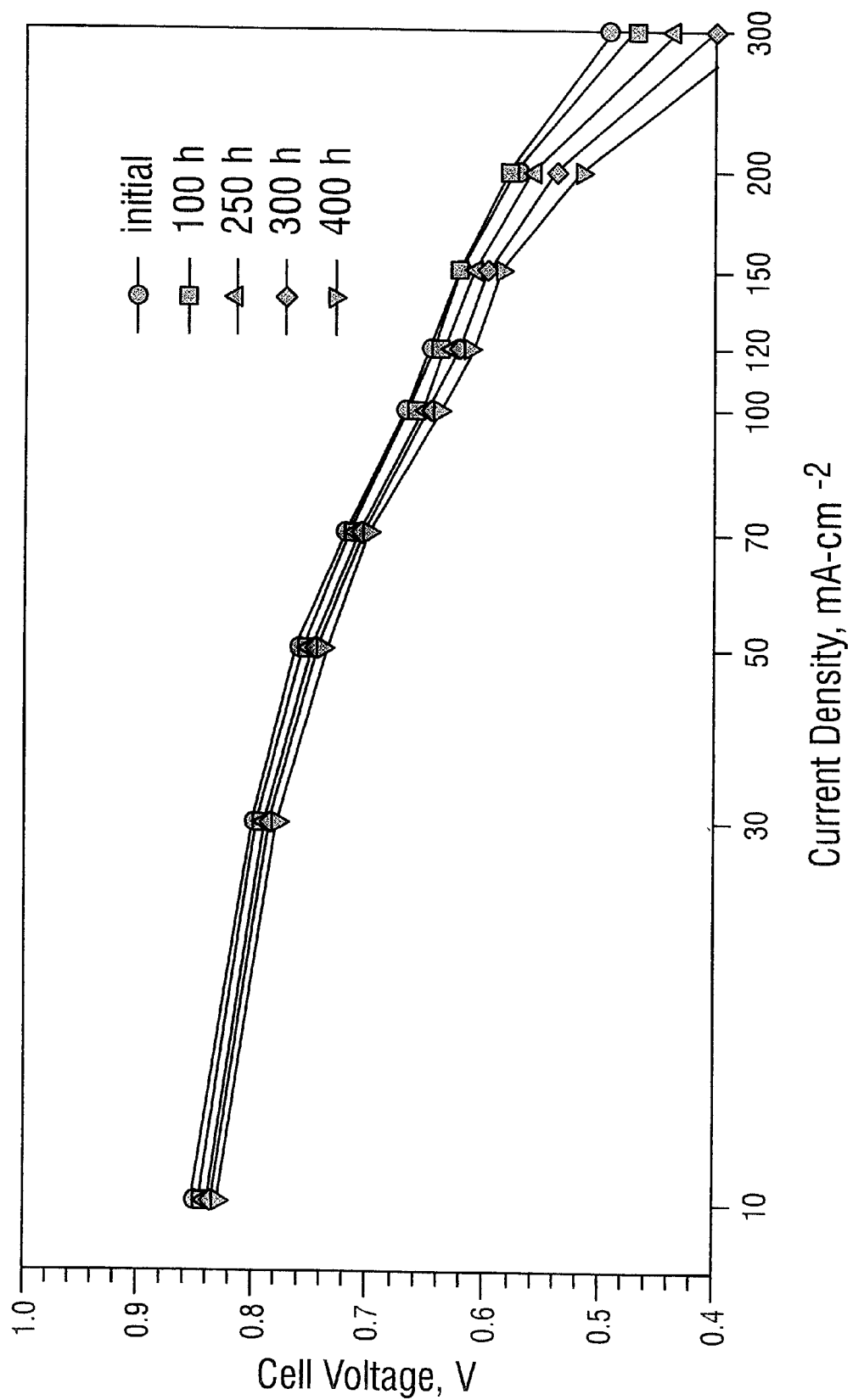
FIG. 16 shows Tafel plots of the data from FIG. 15.

A two-week endurance test carried out with stainless steel fixtures coated with titanium nitride showed some deterioration in performance. FIG. 15 the dependence of the cell potential vs. current density plot on operating time. Again, losses were mainly due to a higher polarization resistance at high current densities. The electrocatalytic activity of the electrodes was not affected, as FIG. 16 shows. This endurance test confirmed the preliminary findings that the titanium nitride coating on the oxygen side of the MEA is unstable and oxidizes quite rapidly.

Figure 17:
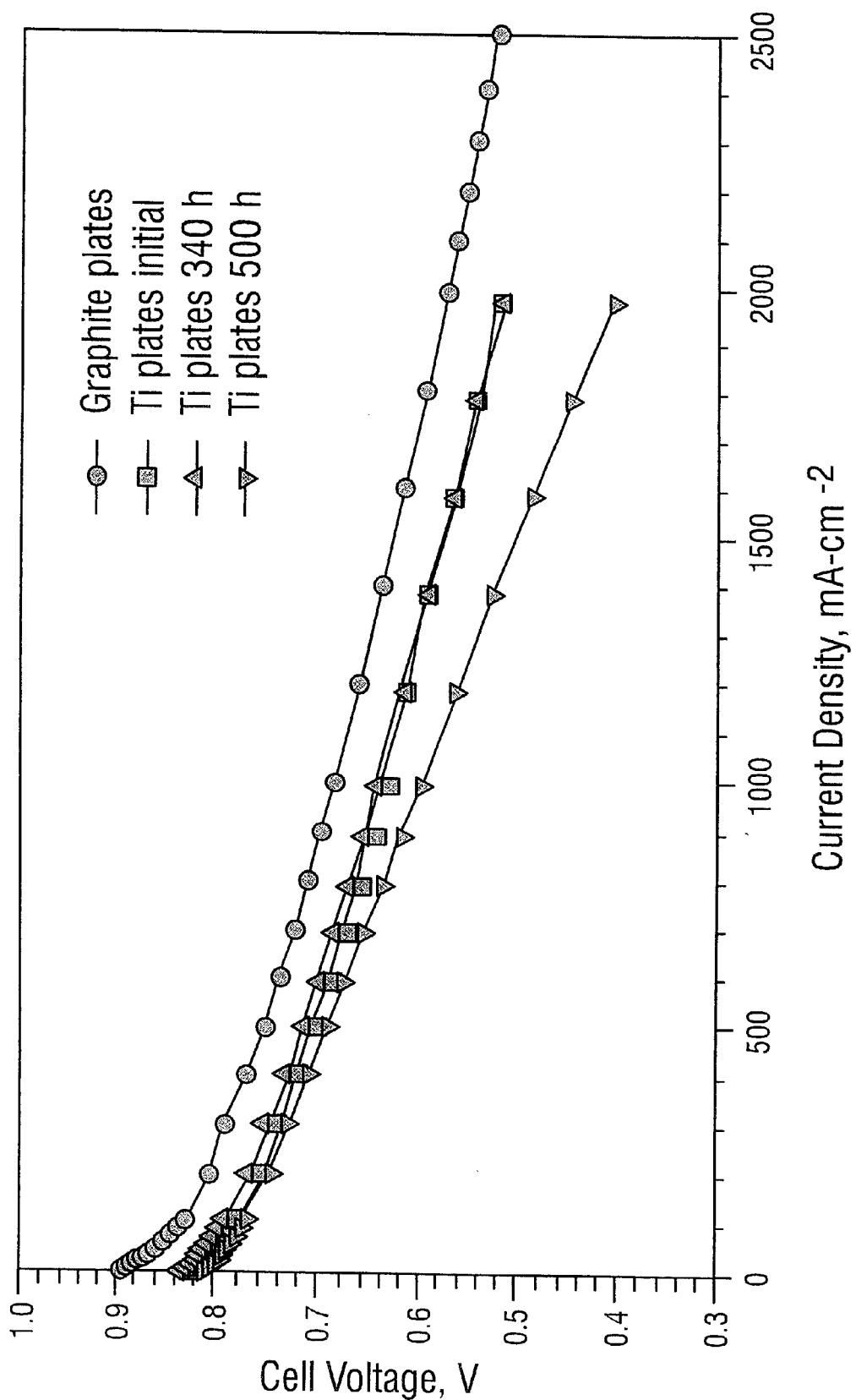
FIG. 17 shows potential-current density plots for 5 cm$^2$ MEAs with 0.4 mg-cm$^{-2}$ platinum loading electrodes and Nafion® 112 membranes in graphite and platinum coated titanium flow-fields. 50° C., 1.0 atma, externally humidified hydrogen/oxygen.

Platinum-Coated Titanium:

After being first tested with conventional graphite endplates to verify its performance, an MEA was endurance-tested in a 5 cm$^2$ cell with platinum-coated titanium plates. The initial performance in both sets of hardware on hydrogen and oxygen reactants was similar. Data from the life test are presented in FIG. 17. There was a slight loss in performance over time when platinum-coated titanium plates were used. The 500-hour endurance test showed little deterioration of performance in the high current density region.

Tin:

According to Pourbaix (Pourbaix, *Atlas d'Equilibres Electrochimiques a 25° C.*, Gauthier-Villars, Paris, 475–484 (1963)), tin oxide should be stable. It is also a well-known electronic narrow-gap semiconductor. However, the thin corrosion film formed during attempts to use tin-foil also had a resistance which increased with time.

However, if a thin layer of tin (about 1 to about 5 μm thick) is used to coat the bipolar assembly, the thickness of tin oxide that can form is limited. A thin layer of tin oxide is a suitable coating and is stable under fuel cell operating conditions.

EXAMPLE 4

Figure 18:
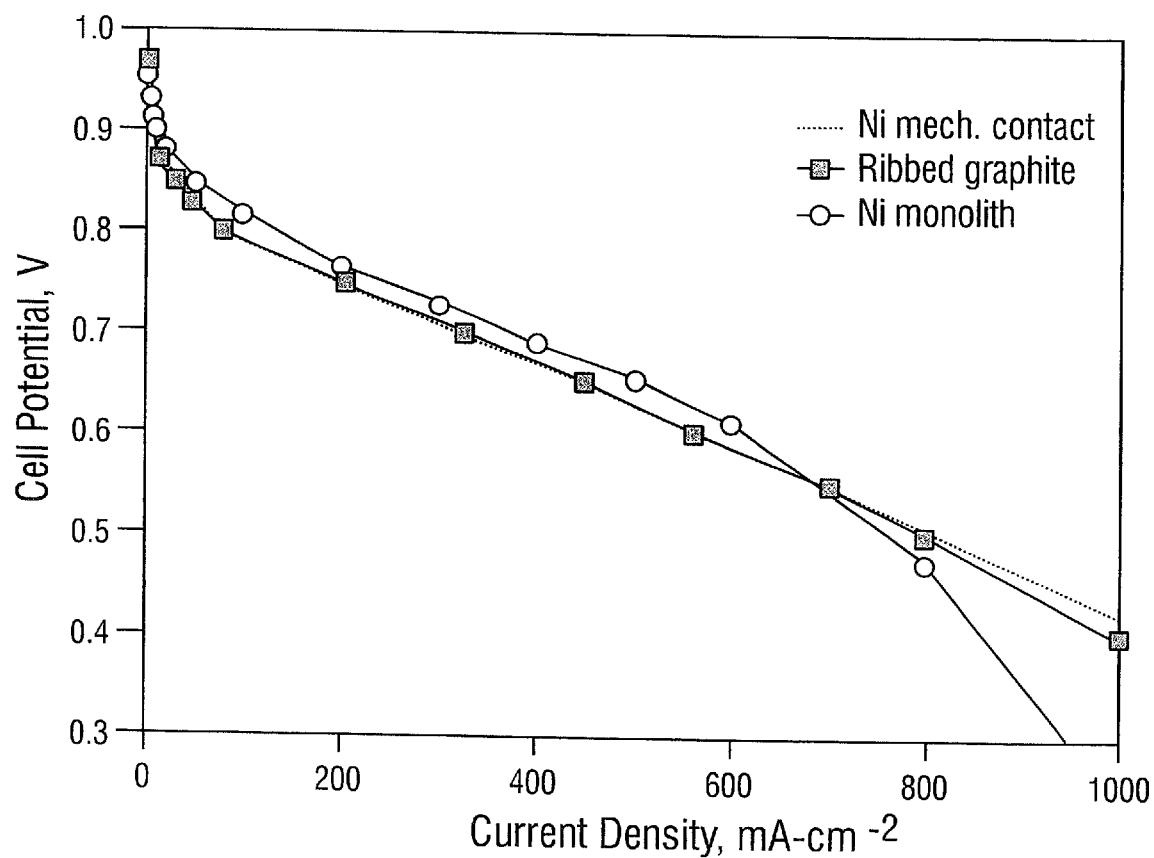
FIG. 18 shows a comparison of electrodes directly bonded to porous flow fields (circles), and electrodes in mechanical contact with ribbed graphite (squares) and porous nickel (dotted line).

Direct Assembly of Gas-Diffusion Electrodes on Porous Flow-Fields:

FIG. 18 shows the performance of a gas diffusion electrode assembled directly on a porous nickel flow field (circles). The experiment was conducted at 55° C. using humidified gasses. The cathode loading was 0.2 mg/cm$^2$ of platinum on high surface area carbon and the hydrogen anode loading was 0.05 mg/cm$^2$ of platinum on high surface area carbon. Included in FIG. 18 is data for ribbed graphite in mechanical contact with a MEA (squares) and data for porous nickel in mechanical contact with a MEA (dotted line) acquired under the same operating conditions. It can be seen that in the current density range of interest (0 to about 600 mA/cm$^2$), gas diffusion electrodes directly assembled on porous nickel flow fields out perform electrodes mechanically contacting porous nickel and ribbed graphite flow fields.

EXAMPLE 5

Porous Copper:

The first metal to be examined was 95% porous copper, whose Pourbaix diagram indicates that it should be quite stable (i.e., immune from corrosion) in the slightly acid conditions (product water at about pH 5.5) at the anode at overpotentials up to +0.4 V. Some corrosion is to be expected at higher potentials, depending on the nature of the anion of the acid present. If sulfate is present from desulfonation of the PEM material, or Cu$^{2+}$ fluoride from any remaining unhydrolyzed acid fluoride intermediate or from decomposed polymer chains, some solubility would be expected. The predicted equilibrium solubility is about 0.015 moles per liter, but pH 5.5 ($3\times10^{-6}$ M $H^+$) indicates that the concentration of strong-acid anions is far below this, so the equilibrium concentration cannot be supported. If the acid is largely carbonic acid (from air), a stable carbonate film, which may be non-conducting, is expected. Copper may be relatively easily gold-plated to protect it from corrosion in this region.

Porous Nickel:

At first sight, nickel is a less attractive candidate than copper. Its Pourbaix diagram shows apparent solubility up to +0.8 V, with probable passivation at higher potentials. At pH 5.5, its equilibrium solubility should be greater than 1 M if the local anion permits. From the argument given for above for copper in the presence of sulfate and fluoride, this is clearly not the case in the PEMFC. As in the case of copper, nickel carbonate would be expected if weak carbonic acid is responsible for the majority of the acidity, which should result in a passivating film. If the argument that the low concentration of strong acid anions will not permit nickel concentrations to exceed $1.5\times10^{-6}$ molar is valid, nickel should not be immune except at negative anode (hydrogen evolution) overpotentials equal to about −0.1 V.

Highly-porous (97% porosity) nickel sheets (nickel "foams") were tested in a 50 cm$^2$ single cell. The foams were of the same type as those used as the conducting support for the active material in recent nickel positive electrodes in nickel-cadmium and nickel-metal hydride secondary cells, and are based on electroless- and electro-plating of polymer foams (e.g., polyurethane). The reticulation dimension was about 0.21 mm.

Figure 19:
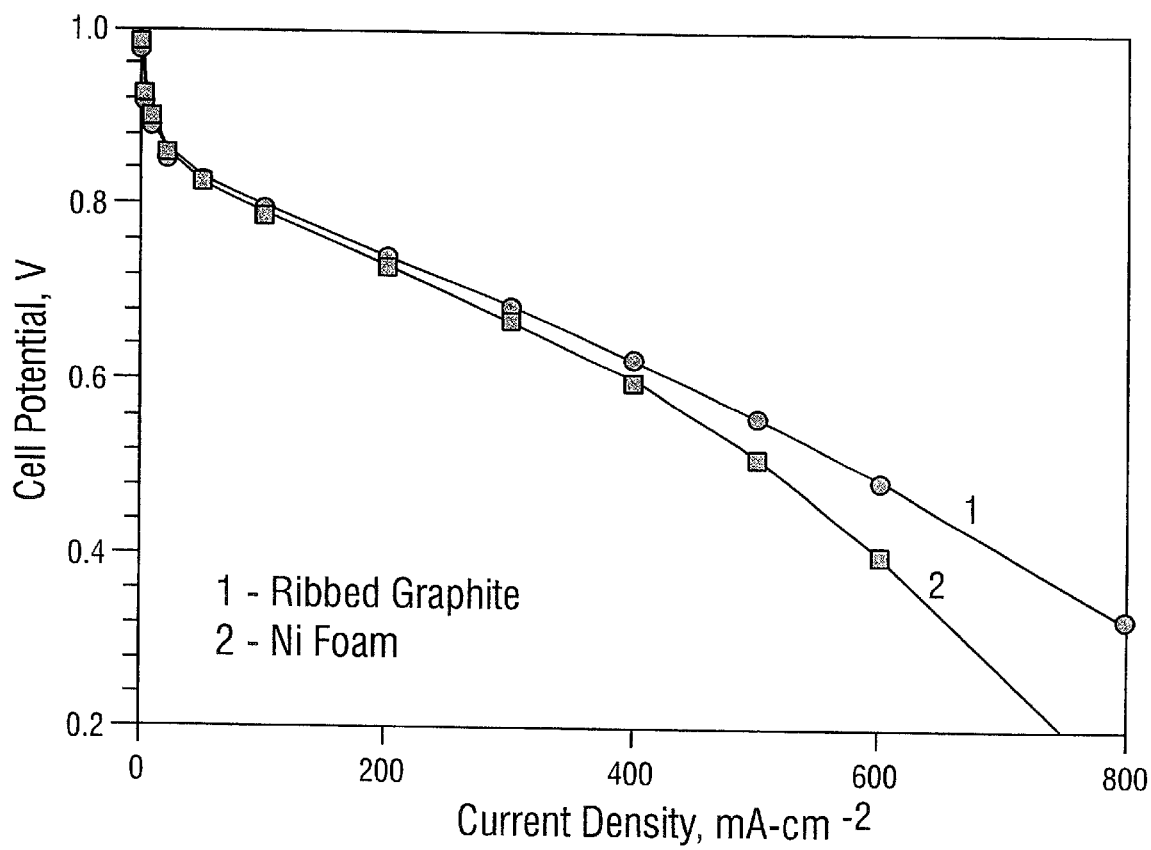
FIG. 19 shows current-potential results for hydrogen-air single cells with standard ribbed graphite and high-porosity unribbed nickel flow fields.

Again, a low-loading MEA was used to compare performance with a standard ribbed graphite bipolar structure. The composition of the MEA tested was: platinum loadings, 0.23 mg-cm$^{-2}$ pure platinum as 30 wt % alloy on graphitic carbon (cathode); 0.05 mg-cm$^{-2}$ as E-TEK 10 wt % platinum on carbon (anode); Nafion® 112 membrane. The MEA was tested at 50° C., with externally humidified reactants at atmospheric pressure. During the tests, constant reactant gas stoichiometries (anode, 1.05; cathode 2.1) were maintained. Two performance evaluations were carried out: (i) with a standard ribbed graphite flow field, and (ii) with high porosity nickel sheets as flow fields. The current-potential results for both flow-field designs operating on hydrogen-air are shown in FIG. 19.

Figure 20:
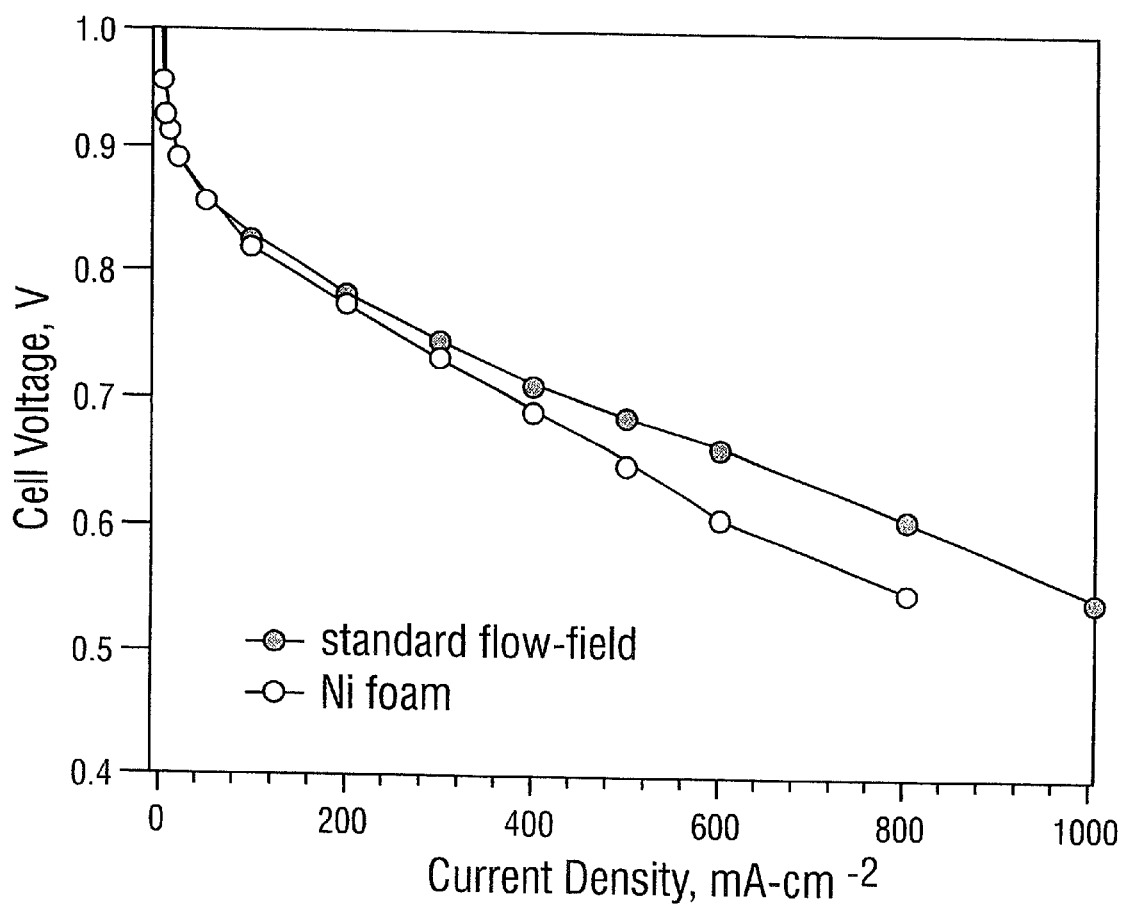
FIG. 20 shows current-potential-current density plots for hydrogen-oxygen single cells with standard ribbed graphite and high-porosity nickel flow fields.
Figure 21:
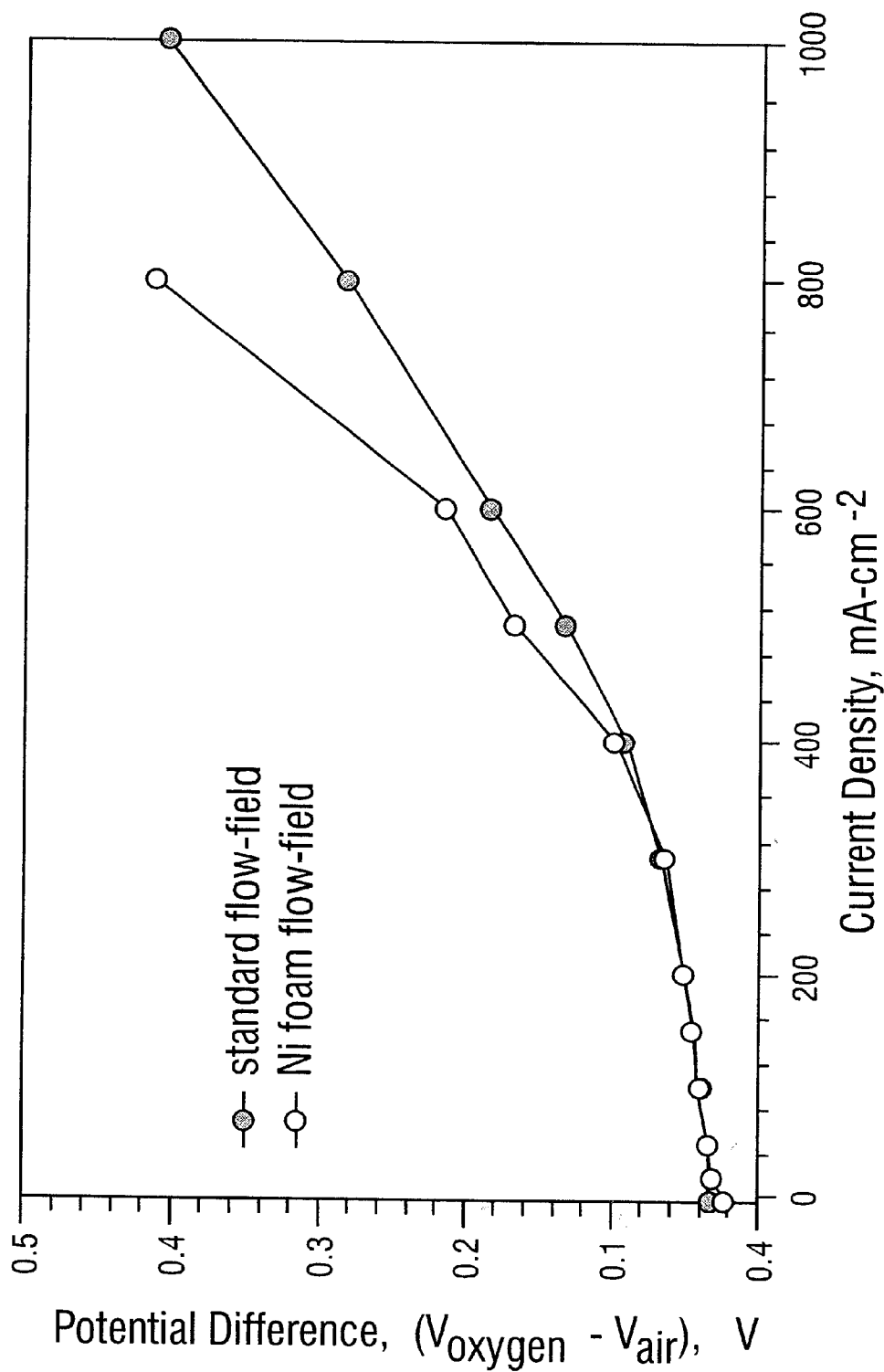
FIG. 21 shows gas diffusion limitations for hydrogen-air single cells with standard ribbed graphite and high-porosity nickel flow fields.

Below 400 mA-cm$^{-2}$, cell performances were equal for both types of flow-fields. The lower performance of the cell with porous nickel flow field at higher current density is probably caused by a combination of higher contact electrical resistance, as well as from increased gas diffusion limitations. This is confirmed by results in FIGS. 20 and 21. FIG. 20 shows the current-potential behavior of the MEA in both types of flow-fields operating as hydrogen-oxygen cells. The slope of the linear part of the polarization curve for the porous nickel flow-field is higher than that for the standard ribbed graphite flow-field. Since the same MEA was used in both tests, the observed increase of the slope must result from poorer electrical contact between the MEA and porous nickel, compared with the contact to ribbed graphite. In addition, gas diffusion limitations within the porous nickel flow field are higher than with the ribbed graphite flow field, as FIG. 21 shows. In it, the potential difference for each cell operating at the same current density on pure oxygen and on air are plotted as a function of current density. At current densities higher than 400 mA-cm$^{-2}$, gas diffusion limitations in the cell with a porous nickel flow field are higher than those with the standard flow field design.

As in the case of Spectracarb Carbon Paper, nickel foams were tested as gas flow fields with high-platinum-loading membrane electrode assemblies (MEAs). The oxygen gas diffusion cathodes fabricated in-house consisted of 1.25 mg-cm$^{-2}$ platinum, which were supplied as 60 wt % platinum supported on Vulcan XC-72R carbon (catalyst purchased from E-TEK, Inc.). The anodes (also in-house fabrication) were 0.05 mg-cm$^{-2}$ platinum supplied as 10 wt % platinum on Vulcan (E-TEK, Inc.). MEAs of 50 cm$^2$ active area were prepared from these electrodes and Nafion® 112 membranes (CG Processing, Inc.) by hot-pressing. After evaluation of the MEA with standard ribbed graphite gas flow fields, the test cell was disassembled and the gas flow fields were exchanged for nickel foam. The performance evaluation procedure was then repeated under the same operating conditions as before.

Figure 22:
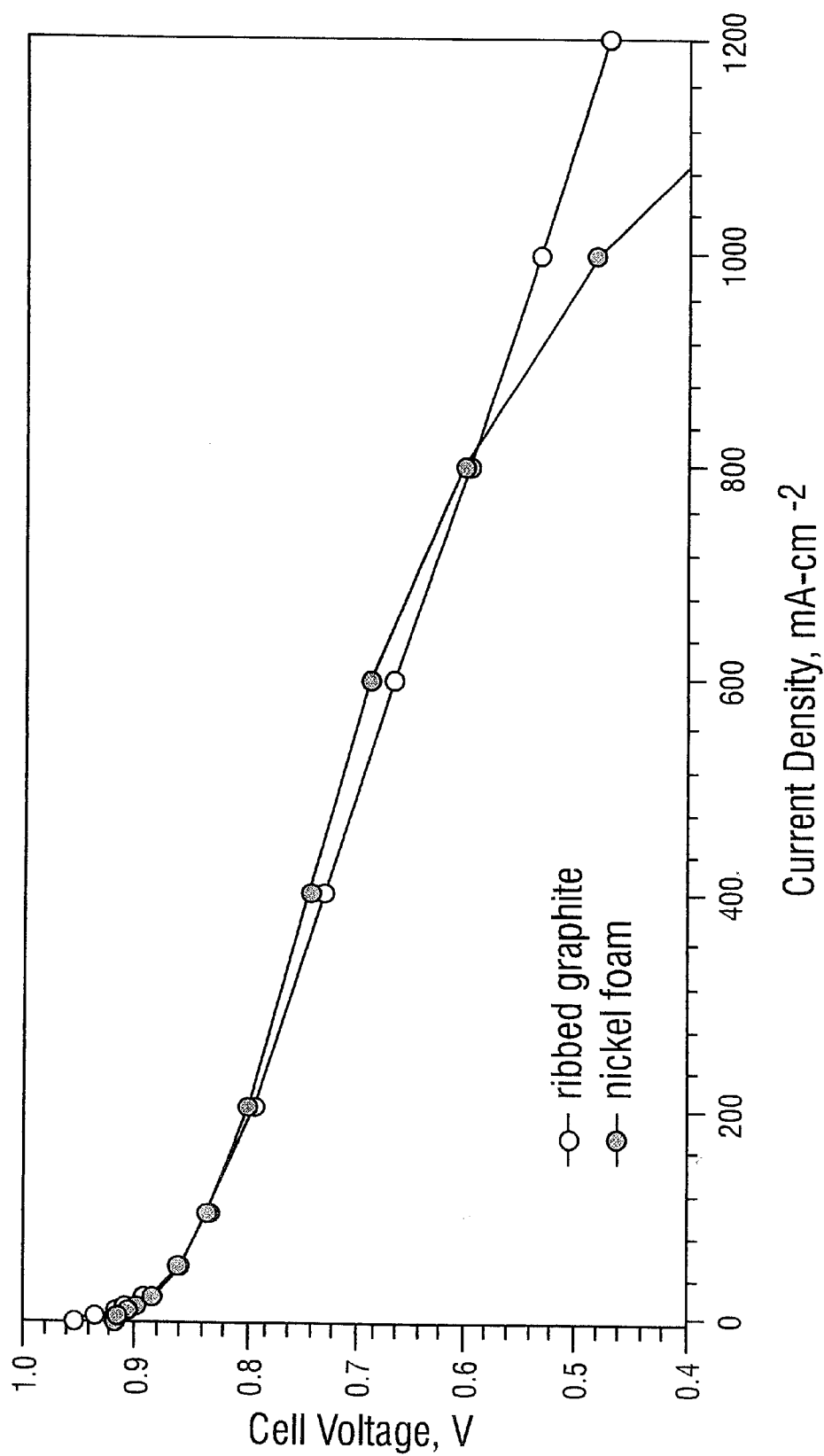
FIG. 22 shows potential-current density plots for 50 cm$^2$ hydrogen/air single cells with ribbed graphite and high-porosity nickel foam flow-fields. 50° C., 1.0 atma, hydrogen/air.

FIG. 22 shows the cell potential-current density characteristics of the high-loading-cathode MEA with graphite and nickel foam gas flow fields. In this case, there was no difference in the cell performance until a current density of 800 mA-cm$^{-2}$. The observed performance loss at extremely high current densities was caused by increased gas diffusion limitations inside the nickel foam gas flow-field. These results were confirmed that exactly the same MEA performance was obtained when the cell operated on pure oxygen, where no diffusion limitations due to the presence of reactants (as distinct from those resulting from the presence of product water) would be expected.

Figure 23:
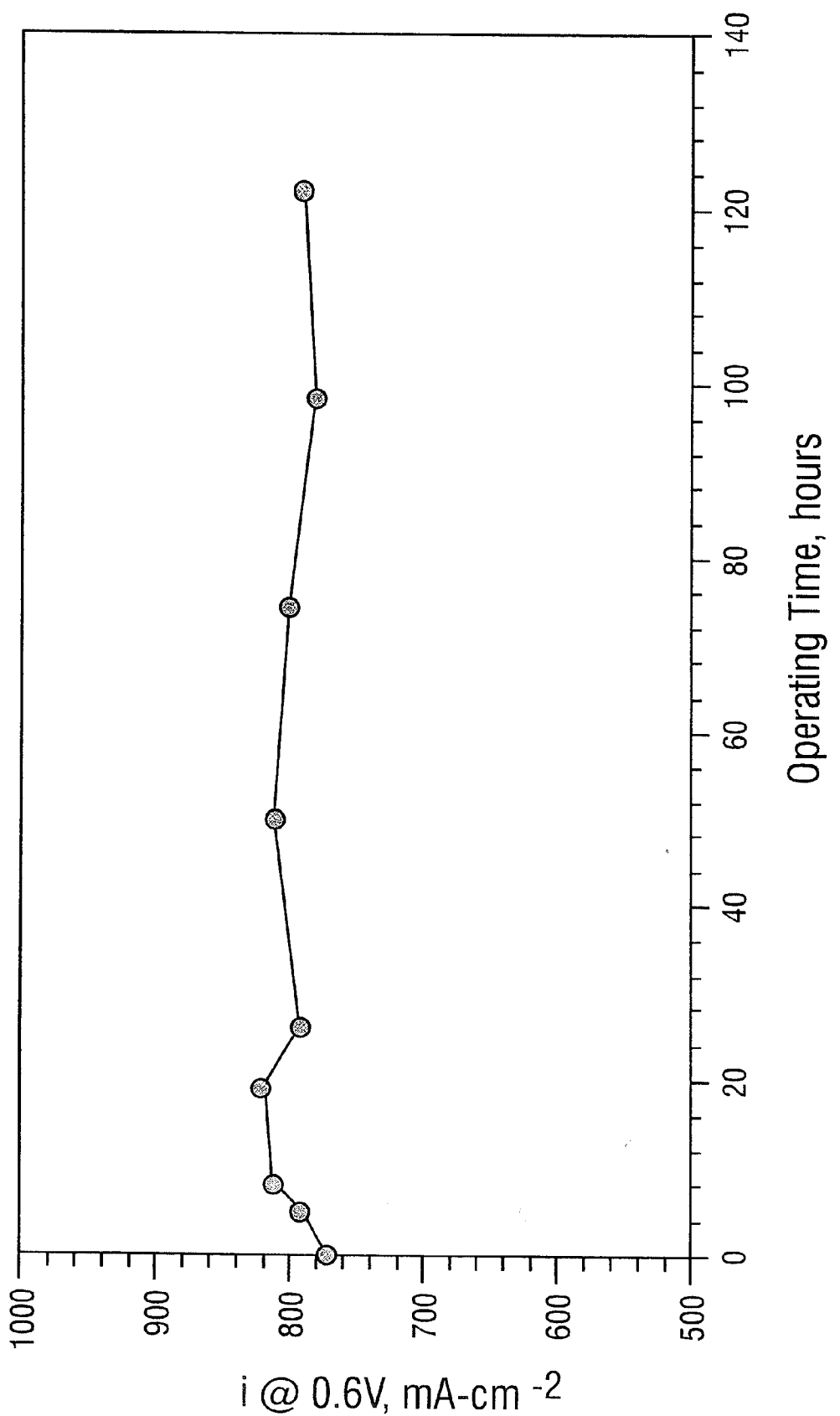
FIG. 23 shows endurance test of 50 cm$^2$ single cell at 0.6 V with nickel foam flow-fields. 50° C., 1.0 atma, hydrogen/air.

To verify the corrosion resistance of nickel foam gas flow-fields under PEMFC operating conditions, a performance endurance test was conducted. FIG. 23 shows results of a seven-day endurance test on a hydrogen/air PEMFC with nickel foam as a gas flow field. The results show that no decrease in performance was observed. In this cell, the nickel foam directly contacted the carbon cloth of the MEA, so the only contact between nickel and an electrolytic phase was with water. Hence, corrosion of nickel appears to be negligible under these conditions.

Figure 25:
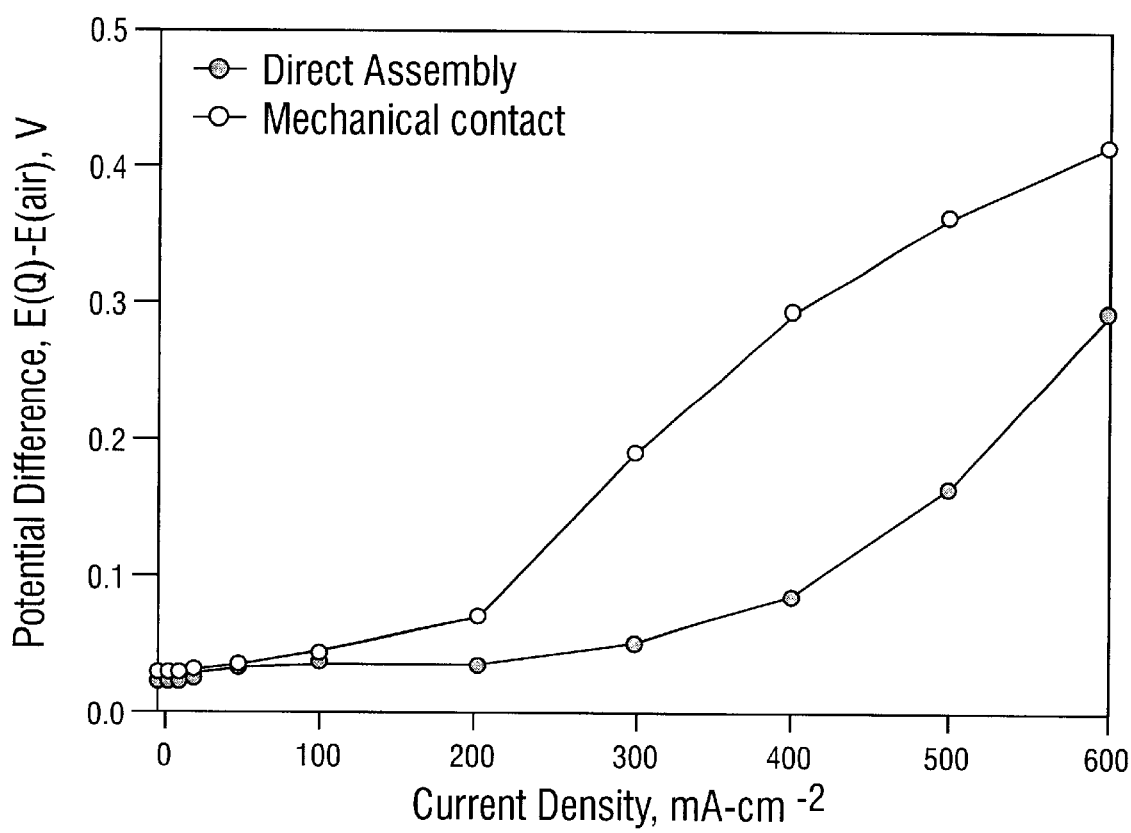
FIG. 25 shows cell potential difference vs. current density plots for hydrogen-oxygen and hydrogen-air single cells with "Direct Assembly" and with "Mechanical Contact" structures on a high-porosity nickel flow field.
Figure 26:
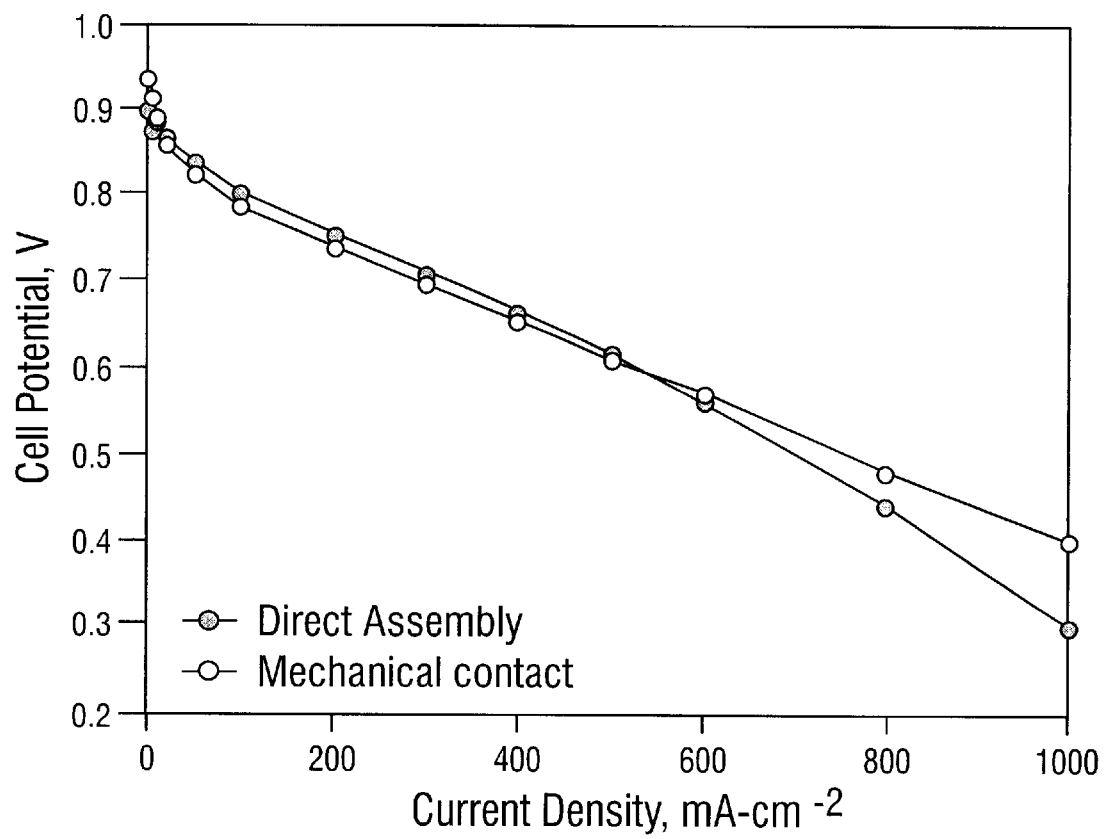
FIG. 26 shows potential-current density plots for hydrogen-oxygen single cells with "Direct Assembly" and "Mechanical Contact" structures on a high-porosity nickel flow field.

Integrated Nickel Foam Flowfields:

Further experiments direct construction of the electrode structure on the flow-field. The electrodes were fabricated by carefully rolling a teflonized carbon black in a form of thick paste ("dough") onto the porous nickel sheets to form a supporting gas-diffusion layer. On this layer the active layer was deposited. It consisted of a graphitized carbon-supported platinum alloy catalyst (IFC Pt—Cr—Co, Ref. 19) and 5 wt % Nafion® solution. The platinum loading of the electrodes was 0.25 mg-cm$^{-2}$ (cathode) and 0.05 mg-cm$^{-2}$ (anode). Nafion® 112 membrane was used as the polymer electrolyte. A membrane-electrode assembly (MEA) with an active area of 50 cm$^2$ was fabricated by hot pressing the electrodes to both sides of the membrane. In the results shown in FIGS. 24 to 26 (see below), the MEA produced in this manner is labeled "Mechanical Contact," and it made only a physical contact with the porous nickel flow-field. A second MEA with the same electrode composition and the same membrane was fabricated on porous nickel using the procedure described above. It is labeled "Direct Assembly" in FIGS. 24 to 26.

Figure 24:
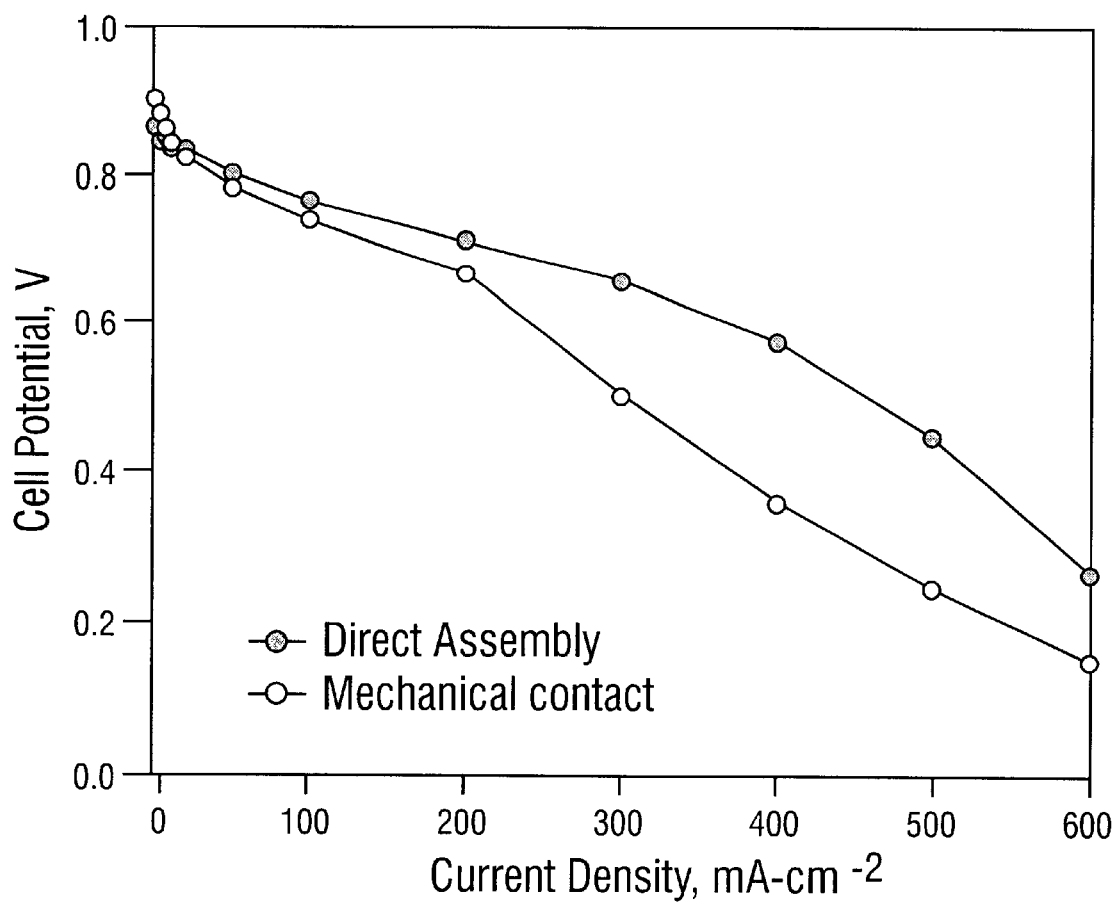
FIG. 24 shows potential vs. current density plots for hydrogen-air single cells with "contact to electrode" and with "directly fabricated electrode" structures on a high-porosity nickel flow field.

A performance evaluation of both types of MEA was carried out in a 50 cm$^2$ single cell with internally humidified hydrogen, air, and oxygen reactants at atmospheric pressure at 50° C. The cell potential as a function of current density for both MEAs is shown in FIG. 24 (hydrogen-air) and FIG. 26 (hydrogen-oxygen for diagnostic purposes). It is apparent that the "Mechanical Contact" MEA had a worse performance at current densities over 200 mA-cm$^{-2}$ than that of the "Direct Assembly" MEA. This difference is better illustrated by the results shown in FIG. 24. As in the case of porous carbon, the loss of performance when the MEA operated on air was due to increased gas-diffusion limitations caused by filling of part of the pores in the nickel sheet with teflonized carbon black. This blockage of the pore resulted in a decrease of volumetric porosity from 97% (for the as-received high-porosity nickel) to 75% (for a nickel substrate incorporating the gas diffusion layer). A comparison of the data when the MEAs operated on pure oxygen (FIG. 26) showed a lower slope for the linear part of current-potential plot for the "Mechanical Contact" MEA. This result is obviously due to the lower contact resistance between the gas-diffusion layer and porous nickel flow field when the electrode is fabricated directly onto the flow field. These initial results show that highly porous nickel is a very promising material for fabricating light-weight flow fields and bipolar plates for PEMFCs.

The weight of a 97% porous nickel or copper foam with a thickness equal to 0.5 mm is about 135 g-m$^{-2}$, representing a materials cost of 80¢ per m$^2$ (16¢ per kW at maximum power) based on the cost of metallic nickel at $6,000 per metric ton.

From the foregoing detailed description of specific embodiments of the invention, it should be apparent that a method and apparatus for generating electrical power using a fuel cell has been disclosed. Although specific embodiments of the invention have been disclosed herein in some detail, this has been done solely for the purposes of illustrating various aspects and features of the invention, and is not intended to be limiting with respect to the scope of the invention. It is contemplated that various substitutions, alterations, and/or modifications, including but not limited to those design alternatives which might have been specifically noted in this disclosure, may be made to the disclosed embodiment without departing from the spirit and scope of the invention as defined in the appended claims.

What is claimed is:

1. A method for making a gas diffusion electrode comprising the steps of:
   a) forming an electrode on a substrate by applying a mixture comprising a polymer electrolyte, an electrocatalyst, and a nanosized fumed silica pore-former to the substrate; and
   b) treating the electrode to remove the nanosized fumed silica pore-former.

2. The method of claim 1, wherein the amount of fumed silica pore-former in the mixture is between about 20 and about 60% by weight.

3. The method of claim 2, wherein the amount of fumed silica pore-former in the mixture is between about 35 and about 45% by weight.

4. The method of claim 1, wherein the electrode is treated chemically to remove the fumed silica pore-former.

5. The method of claim 4, wherein the electrode is treated to remove the fumed silica pore-former by contacting the electrode with an alkali metal hydroxide solution.

6. The method of claim 1, wherein the substrate is carbon cloth, carbon paper, porous carbon, or a porous metal.

7. The method of claim 6 wherein the substrate is a porous metal that comprises a three-dimensional reticulated metal structure.

8. The method of claim 7, wherein the porous metal comprises copper, nickel, aluminum, titanium, or an aluminum-titanium alloy.

9. The method of claim 1, wherein the mixture is applied to the substrate by rolling, calendering, pressing, printing, spraying, brushing, electrostatic spraying, dry filtering or wet filtering.

10. A method for making a membrane electrode assembly comprising the steps of:
    a) forming an electrode on a substrate by applying a mixture comprising a polymer electrolyte, an electrocatalyst, and a nanosized fumed silica pore-former to the substrate;
    b) attaching the electrode to a membrane to form a membrane electrode assembly; and
    c) treating the electrode to remove the fumed silica pore-former.

11. The method of claim 10, further comprising the step of treating the electrode to activate the polymer electrolyte.

12. The method of claim 11, wherein the electrode is treated to activate the polymer electrolyte by contacting the electrode with an acidic solution.

13. The method of claim 10, wherein the membrane is a polymer electrolyte membrane.

14. The method of claim 13, wherein the membrane is a fluorinated sulfonic acid membrane.

15. A method for making a gas permeable layer for use in a fuel cell comprising the steps of:
    a) applying to a composition a nanosized fumed silica pore-former; and
    b) treating the composition to remove the nanosized fumed silica pore-former.

16. The method of claim 15, wherein the gas permeable layer is a hydrophilic layer.

17. The method of claim 16, wherein the hydrophilic layer comprises a polymer and high surface area carbon particles.

18. The method of claim 17, wherein the polymer is a perfluorosulfonic acid polymer.

19. The method of claim 17, wherein the high surface area carbon particles comprise carbon black.

20. The method of claim 15, wherein the gas permeable layer is an intermediate layer.

21. The method of claim 20, wherein the intermediate layer comprises a polymer and high surface area carbon particles.

22. The method of claim 21, wherein the polymer is selected from poly-tetrafluoroethylene, perfluoroethylene-perfluoropropylene copolymer, perfluoroalkoxy, or polyvinylidene fluoride.

23. An electrode comprising a polymer electrolyte, an electrocatalyst, and nanosized pores, wherein the nanosized pores are formed by incorporating a nanosized fumed silica pore-former into the electrode and treating the electrode to remove the nanosized fumed silica pore-former.

24. A fuel cell comprising an electrode, wherein the electrode comprises a polymer electrolyte, an electrocatalyst, and nanosized pores, wherein the nanosized pores are formed by incorporating a nanosized fumed silica pore-former into the electrode and treating the electrode to remove the nanosized fumed silica pore-former.

25. A fuel cell comprising a layer having nanosized pores, wherein the nanosized pores are formed by incorporating a nanosized fumed silica pore-former into the layer and treating the layer to remove the nanosized fumed silica pore-former.

26. The fuel cell of claim 25, wherein the layer is an electrode.

27. The fuel cell of claim 25, wherein the layer is a hydrophilic layer.

28. The fuel cell of claim 25, wherein the layer is an intermediate layer.

29. A fuel cell stack comprising a layer having nanosized pores, wherein the nanosized pores are formed by incorporating a nanosized fumed silica pore-former into the layer and treating the layer to remove the nanosized fumed silica pore-former.

30. The fuel cell stack of claim 28, wherein the layer is an electrode.

31. The fuel cell stack of claim 28, wherein the layer is a hydrophilic layer.

32. The fuel cell stack of claim 28, wherein the layer is an intermediate layer.

* * * * *